(12) United States Patent
Yang

(10) Patent No.: US 9,296,046 B2
(45) Date of Patent: Mar. 29, 2016

(54) LOCKING MECHANISM, AND CLAMPING HEAD DEVICE AND FASTENING CLAMP WITH LOCKING MECHANISM

(75) Inventor: Guimu Yang, Wendeng (CN)

(73) Assignee: Shandong Weida Machinery Co., Ltd., Wendeng (CN)

( * ) Notice: Subject to any disclaimer, the term of this patent is extended or adjusted under 35 U.S.C. 154(b) by 977 days.

(21) Appl. No.: 13/168,064

(22) Filed: Jun. 24, 2011

(65) Prior Publication Data

US 2011/0316240 A1 Dec. 29, 2011

(30) Foreign Application Priority Data

Jun. 25, 2010 (CN) .......................... 2010 1 0215225

(51) Int. Cl.
*B23B 31/12* (2006.01)
*F16B 39/28* (2006.01)

(52) U.S. Cl.
CPC ........... *B23B 31/123* (2013.01); *B23B 31/1238* (2013.01); *F16B 39/28* (2013.01); *B23B 2231/38* (2013.01); *Y10S 279/902* (2013.01); *Y10T 279/17623* (2015.01); *Y10T 279/17632* (2015.01); *Y10T 279/32* (2015.01)

(58) Field of Classification Search
CPC .............. B23B 31/123; B23B 31/1238; B23B 2231/38; Y10T 279/32; F16B 39/28
USPC ...................... 279/60–65, 140, 902
See application file for complete search history.

(56) References Cited

U.S. PATENT DOCUMENTS 5,375,858 A 12/1994 Röhm
7,527,273 B2 * 5/2009 Bordeianu .................. 279/62

FOREIGN PATENT DOCUMENTS

JP          06-277913      10/1994

* cited by examiner

*Primary Examiner* — Eric A Gates
*Assistant Examiner* — Paul M Janeski
(74) *Attorney, Agent, or Firm* — Fay Sharpe LLP

(57) ABSTRACT

The present invention provides a locking mechanism which does not unlock a locked fixing state inadvertently and can lock the fixing state reliably, and a clamping head device and a fastening clamp with the locking mechanism. In a rotation control body 30 for locking the fastening fixing state, a locking gear 34 whose rotation is fixed, and a nut gear 32 which is fixed in the axial direction and the rotation direction fixed are respectively provided with circumferential surface gears 325, 348 and ratchets 326, 346, wherein the circumferential surface gears 325 and 348 are meshed in axial direction, and the ratchets 326 and 346 are meshed in radial direction. In addition, the locking mechanism also comprises a cam ball 33 and a guide groove 314 which are used for switching between the fastening locking state in which the circumferential surface gears 325, 348 and the ratchets 326, 346 are meshed and the unlocking state in which the meshes of the circumferential surface gears 325, 348 and the ratchets 326, 346 are unlocked.

11 Claims, 20 Drawing Sheets

“LOCKING MECHANISM, AND CLAMPING HEAD DEVICE AND FASTENING CLAMP WITH LOCKING MECHANISM”

FIELD OF THE INVENTION

The present invention relates to a clamping head device inserted and fixed in the central shaft of a rotary clamp such as screwdriver clamp or drill clamp and the like, a fastening clamp for fastening the fastened part and a locking mechanism thereof, which are used in electric tools such as electric screwdriver or vibration drill and the like.

BACKGROUND OF THE INVENTION

At the present, a clamping head device provided with a locking mechanism is proposed, which is arranged at the front end of the electric screwdriver and the like. The locking mechanism fastens the central shaft of the inserted rotary clamp by using clamping jaws from three directions, and locks the fastening state (please refer to the No. 1 patent document for the clamping head device with the locking mechanism).

The clamping head device is provided with a clamping ring which restricts the axial direction motion relatively to the clamping head main body, and a retaining ring which can move along axial direction relatively to a pawl main body. Furthermore, a ratchet meshed toward a slack direction is arranged on the side opposite to the clamping ring and the retaining ring respectively.

Therefore, the axial movement of the retaining ring ensures that the clamping ring is meshed with the ratchet of the retaining ring, so that the rotation in the fastening unlocking direction is restricted in the state of fastening and fixation, and the fastening state can be locked.

However, the retaining ring is made to move along the axial direction, such that the clamping ring is meshed with the ratchet of the retaining ring. Therefore, when the retaining ring inadvertently moves to the direction reverse to the axial direction, the circumstance that the locking state is unlocked inadvertently may happen.

The No. 1 patent document: Japanese patent publication NO. H06-277913.

SUMMARY OF THE PRESENT INVENTION

The present invention aims to provide a locking mechanism which does not unlock the locked fixing state inadvertently and can lock the fixing state reliably, and a clamping head device and a fastening clamp with the locking mechanism.

The present invention relates to a locking mechanism which is configured for locking a fastening fixing state of a male screw body and a female screw body screw-jointed, in a screw-joint structure which is composed of the male screw body with a male screw part on the external circumferential surface and a female screw body with a female screw part which is on the internal circumferential surface and screwed with the male screw part, characterized by comprising: a male screw side gear part, which has been fixed in the screw-joint rotation direction relative to the male screw body, and a female screw side gear part, which has been fixed in the screw-joint direction, i.e. the axial direction and the screw-joint rotation input direction relative to the female screw body, wherein the male screw side gear part and the female screw side gear part are respectively provided with mesh gears meshed in the screw-joint rotation direction, and ratchets meshed only in the screw-out rotation direction of the screw-joint rotation directions, and one party of the mesh gears and the ratchets is meshed in the axial direction, and the other party is meshed in the radial direction, wherein, the locking mechanism further comprises a locking switching unit which is used for switching between the fastening locking state in which the mesh gears and the ratchets are meshed and the unlocking state in which the meshes of the mesh gears and the ratchets are unlocked.

The male screw part with the male screw body and the female screw part with the female screw body which are composed of screw threads and a thread groove can be used as a screw part which can be screw-joined.

The screw-joint rotation direction is the rotation direction to screw in/screw out the male screw body and the female screw body. The screw-joint rotation input direction can serve as the rotation input direction to screw in/screw out the male screw body and the female screw body.

The so called "being meshed in the axial direction" refers to the circumstance that the formation direction of gear teeth, i.e. the height direction of the gear teeth is the axial direction. Correspondingly, the so called "being meshed in the radial direction" refers to the circumstance that the formation direction of gear teeth, i.e. the height direction of the gear teeth is the radial direction.

According the present invention, the locked fixing state will not be unlocked inadvertently, and the fixing state can be locked reliably.

To be detailed, in the locking state in which the switching of switching unit is locked, the gears are meshed and the ratchets are meshed in both the axial direction and the radial direction. Therefore, compared with the locking mechanism in which the ratchets are meshed only in the axial direction, this locking mechanism can lock the fastening state reliably.

As one mode of the present invention, the female screw body comprises the female screw side gear part with the female screw part on the internal circumferential surface, and a female screw operating part which performs the operation of screwing in/screwing out the female screw side gear part and can do differential motion relatively to the female screw side gear part. Besides, the present invention also comprises a relative change unit which is used for one party of the male screw side gear part and the female screw side gear part to generate relative change relatively to the other by the differential motion of the female screw operating part relative to the female screw side gear part, wherein the locking switching unit is consisted of the relative change unit which changes the mesh state of the mesh gear and the ratchet through the above-mentioned relative change.

That one of the male screw side gear part and the female screw side gear part generates relative change relatively to the other means that at least one is made to move relatively to the other, or at least one deforms relatively to the other.

According to the present invention, through the differential motion of the female screw operating part relative to the female screw side gear part, the relative change unit is configured such that the male screw side gear part and the female screw side gear part change relatively, with the result that the states of the mesh gear and the ratchet can be switched. Therefore, through switching the locking states by means of the relative deformation, the fastening fixing state can be locked reliably.

In addition, as one mode of the present invention, the male screw side gear part and the female screw side gear part are arranged on the axis same to the above axial direction. Furthermore, the male screw side gear part and the female screw side gear part are respectively provided with axial direction opposite surfaces which have an opposite axial direction, and radial direction opposite surfaces which have an opposite radial direction. The ratchet in which the gear teeth direction is slightly actinomorphic is arranged on the axial direction opposite surface, and the mesh gear that the gear teeth direction is the axial direction is arranged on the radial direction opposite surface. An axial direction relative move unit, forming the relative change unit, is configured such that one of the male screw side gear part and the female screw side gear part moves relatively to the other in the axial direction between the mesh position in which the ratchets are in contact therebetween and the separation position in which the ratchets are separated.

According to the present invention, the axial direction relative move unit is configured such that the male screw side gear part and the female screw side gear part move relatively in the axial direction, and the ratchet arranged on the axial direction opposite surface is meshed with the mesh gear arranged on the radial direction opposite surface, so that the fastening fixing state can be locked.

In addition, as another mode of the present invention, the present invention can further comprise a separation state bearing which is used for assisting the rotation of the female screw body placed at the separation position.

According to the present invention, even during unlocking the locked fastening fixing state, due to the bearing effect of the separation state bearing, the locked fastening fixing state can be unlocked smoothly.

In addition, as another mode of the present invention, the present invention can further comprise an biasing unit which is used for biasing the female screw side gear parts against the above female screw side gear parts opposite to the axial direction opposite surface. The axial direction relative move unit can be composed by a press unit and a guide groove, wherein the press unit presses the male screw side gear part toward the direction of being separated from the axial direction opposite surface against the biasing force of the biasing unit; and the guide groove is arranged on the female screw operating part. Through the differential rotation of the female screw operating part relative to the female screw side gear part, it is guided after being pressed to a press position corresponding to a specified press amount.

The biasing unit can be composed by a spiral spring, a disk spring, a leaf spring or a rubber ring.

According to the present invention, through the biasing force of the biasing unit, the mesh state of the ratchet arranged on the axial direction opposite surface can be maintained.

In addition, the press unit, which is guided by the guide groove and has the specified press amount, is configured such that the axial direction opposite surfaces are separated with each other, and the mesh state can be unlocked reliably, against the biasing force of the biasing unit.

In addition, as another mode of the present invention, the guide groove guides the press unit into the unlocking position which is formed by the first press amount with which the meshes of the mesh gear and the ratchet have been unlocked, the fastening locking position which is formed by the second press amount with which the mesh gear and the ratchet are meshed, and the unidirectional fastening locking position which is formed by the third press amount with which only the mesh gear and the above ratchet are meshed, wherein the press amounts are set by the gradual increasing sequence of the first press amount, the third press amount and the second press amount. The ratchet is arranged as follows: in the locking state that the mesh gear and the ratchet are meshed, the gear mesh height in the axial direction is lower than the difference between the first press amount and the second press amount; and in the unlocking state that the mesh between the mesh gear and the ratchet is unlocked, the separation distance in the axial direction is shorter than the difference between the first press amount and the third press amount. Furthermore, the mesh gear is arranged as follows: in the locking state that the mesh gear and the ratchet are meshed, the gear mesh height in the axial direction is lower than the difference between the third press amount and the second press amount; and in the unlocking state that the mesh between the mesh gear and the ratchet is unlocked the separation distance in the axial direction is shorter than the difference between the first press amount and the second press amount.

If among the press amounts which are set by the gradual decreasing sequence of the first press amount, the third press amount and the second press amount, as long as the second press amount that is minimal is less than the third press amount, the press amount may be zero.

According to the present invention, the switching can be made among the fastening locking state that the mesh gear and the ratchet are meshed, the unidirectional fastening locking state that the rotation force in one direction is locked while the rotation can be made in the other direction after the ratchet is meshed, and the unlocking state the mesh between the mesh gear and the ratchet is unlocked.

To be detailed, the guide groove guides the press unit to the unlocking position of the first press amount, the unidirectional fastening locking position of the third press amount, and the fastening locking position of the second press amount, so that the switching can be made among the unlocking state, the unidirectional fastening locking state and the fastening locking state.

In addition, in virtue of the mesh state of the ratchets and the biasing force of the biasing unit, the press unit is guided automatically from the unidirectional fastening locking position to the fastening locking position, so that the unidirectional fastening locking state is switched into the fastening locking state.

Furthermore, the present invention relates to a clamping head device installed on the driving device which is provided with a rotatable driving shaft. The clamping head device is characterized by comprising the above locking device, and further a slightly cylindrical clamping head main body, a plurality of clamping head jaws, a nut ring, and a locking flange disc, wherein the clamping head main body is arranged on the coaxial shaft of the driving shaft and is provided at the front end side with a shaft hole for inserting the central shaft of the rotary clamp; the clamping head jaws are connected to the shaft hole, capable of moving relatively to the clamping head main body, and provided with a male screw part on the circumferential surface; the nut ring can be maintained on the clamping head main body in a rotary state, provided with a female screw part on the internal circumferential surface which is screwed with the male screw part arranged on the external circumferential surface of a plurality of clamping head jaws, and can move a plurality of clamping head jaws synchronously; the locking flange disc can slide in the axle center direction relatively to the clamping head main body and is fixed in the rotation. In the above, the nut ring and the locking flange disc are arranged adjacently in the axle center direction at the periphery of the clamping head main body. Furthermore, the clamping head device also comprises a rotation limiting unit which is used for limiting the relative rotation of the nut ring and the locking flange disc toward the direction of unfastening the nut ring in the fastening fixing state, and a limitation releasing unit which is used for releasing the limitation of the rotation limiting unit on the relative rotation of the nut ring and the locking flange disc. The clamping head main body forms the male screw body; the locking flange disc forms the male screw side gear part; the nut ring forms the female screw side gear part; the rotation limiting unit forms the mesh gear and the ratchet; and the limitation releasing unit forms the locking switching unit.

The driving device with the rotatable driving shaft can be used as a rotary electric tool such as vibration electric drill or electric screwdriver and the like.

The rotary clamp can be used as a rotary electric drill clamp, a cross screwdriver or a straight screwdriver.

The central shaft of the rotary clamp can also be called as tool shank, and the clamping head jaw can also be called as clamping jaw.

According the present invention, in the clamping head main body, the locking mechanism can lock the fastening fixing state of the central shaft of the rotary clamp of the locking mechanism with the fastening fixing state realized by the clamping head jaw, and can release the fastening fixing state.

Furthermore, the present invention relates to a fastening tool for screwing and fastening bolts and nuts, which is characterized by comprising the locking mechanism wherein the male screw body with the male screw part on the external circumferential surface forms the above bolt; the female screw body with the female screw part which is arranged on the internal circumferential surface and can be screwed with the male screw part, the male screw side gear part which has fixed the screw-joint rotation direction relatively to the male screw body, and the female screw side gear part which has fixed the axial direction and the screw-joint rotation input direction relatively to the female screw body form the above nut.

According the present invention, the locking mechanism can lock the fastening fixing state of the fastening clamp which formed by the bolt and the nut, and at the same time can also release the fastening fixing state locked.

According the present invention, a locking mechanism which does not release the locked fixing state inadvertently and can lock the fixing state reliably, and a clamping head device and a fastening clamp with the locking mechanism are provided.

BRIEF DESCRIPTION OF THE DRAWINGS

The drawings in the specification provide a further understanding of the present invention and constitute a part of the application. The exemplary embodiments of the present invention and the explanation thereof are given for illustrating the present invention, but not unduly limiting the present invention, and wherein.

DETAILED DESCRIPTION

The embodiments of the present invention will be detailed hereinafter with reference to the drawings.

Figure 4:
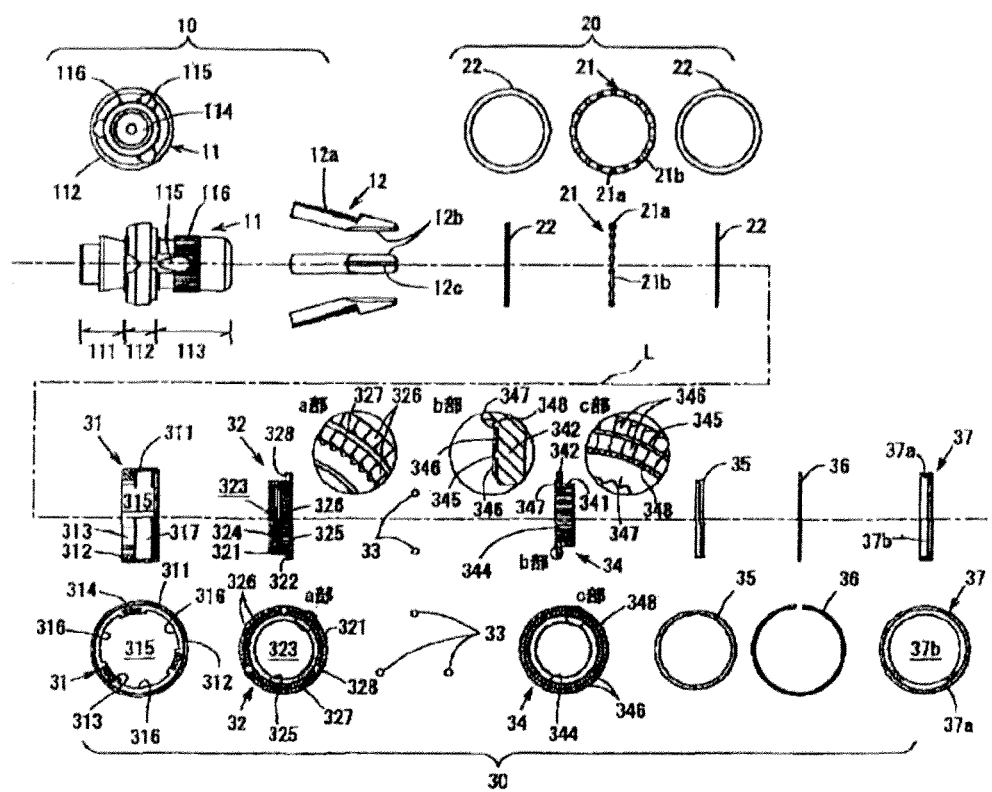
FIG. 4 is exploded explanatory drawings illustrating the front face and side face of individual composing elements of the clamping head device.

Furthermore, FIG. 4 shows the exploded explanatory drawings illustrating the front face (back face) and side face (cross section) of individual composing elements of the clamping head device 1. To be more detailed, FIG. 4 shows the back view of a locking gear 34 and a thread-off proof ring 36, and also shows the front view of the other composing elements. In addition, FIG. 4 shows the longitudinal sectional drawing of a thrust bearing 21, pads 22, a nut ring 31, a nut gear 32 and a locking gear 34, and the side view of the other composing elements.

Figure 6:
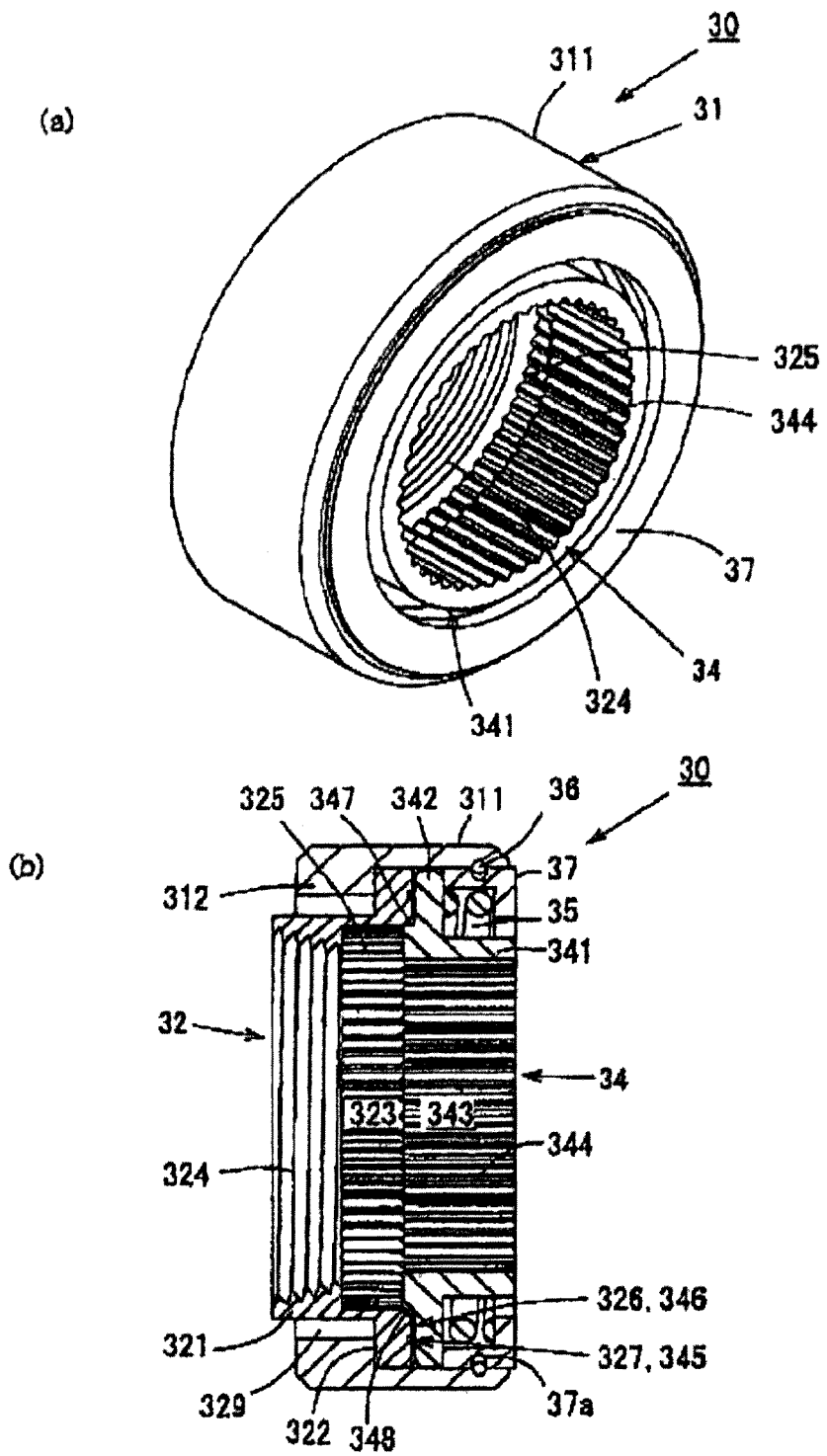
FIG. 6 is an explanatory drawing of the locking mechanism.

In addition, FIG. 6 (a) is a perspective diagram of a rotation control body 30, and FIG. 6 (b) is a longitudinal sectional drawing of the clamping head main body 10. In addition, FIG. 7 (a) is an exploded perspective diagram of the nut ring 31, the nut gear 32, the cam ball 33 and the locking gear 34 which are the main composing elements of the rotation control body 30, observed from the upper left direction of the front face; and FIG. 7 (b) is an exploded perspective diagram of the main composing elements of the rotation control body 30 observed from the upper right direction of the back face.

Figure 8:
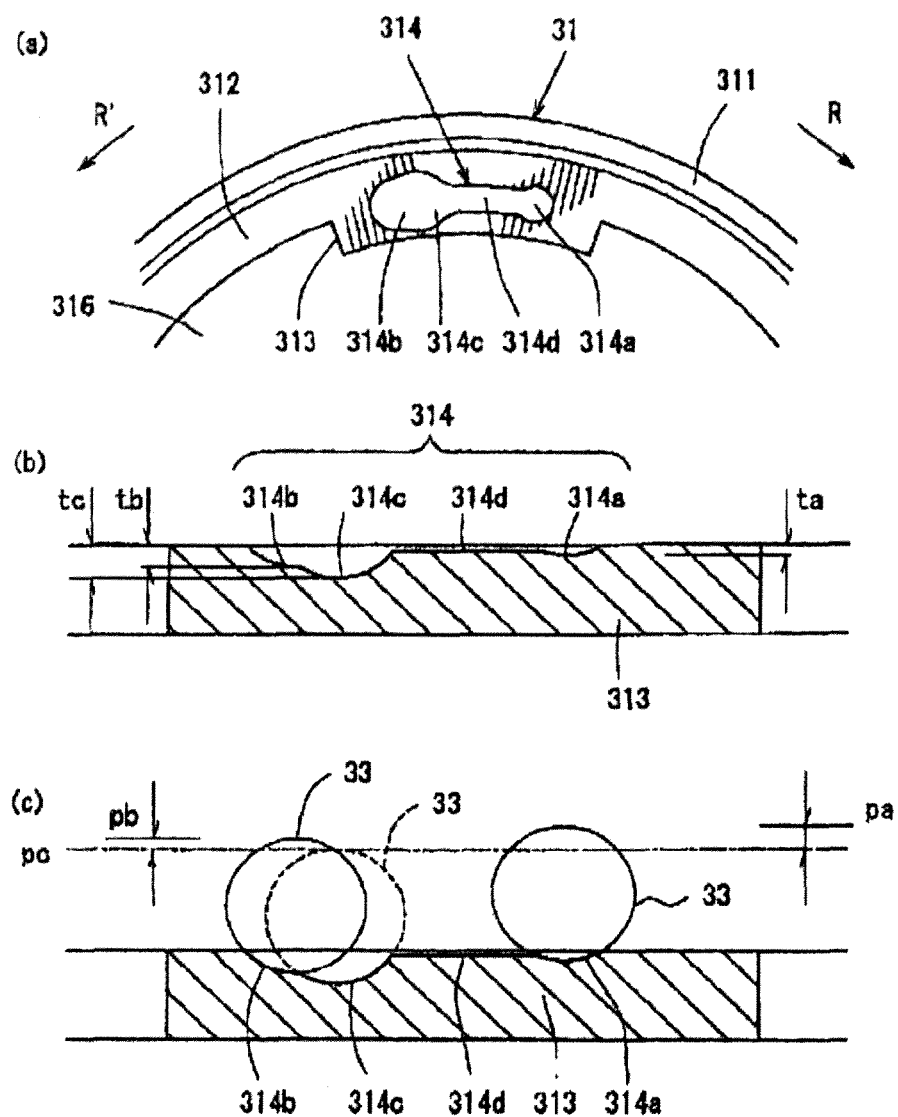
FIG. 8 is an explanatory drawing of the guide groove and the press amount.

FIG. 8 is an explanatory drawing of the depth t in the guide groove 314 and the press amount p. FIG. 8 (a) is a partial enlarged front view of the guide groove 314; and FIG. 8 (b) is a partial longitudinal sectional drawing of the guide groove 314.

Figure 9:
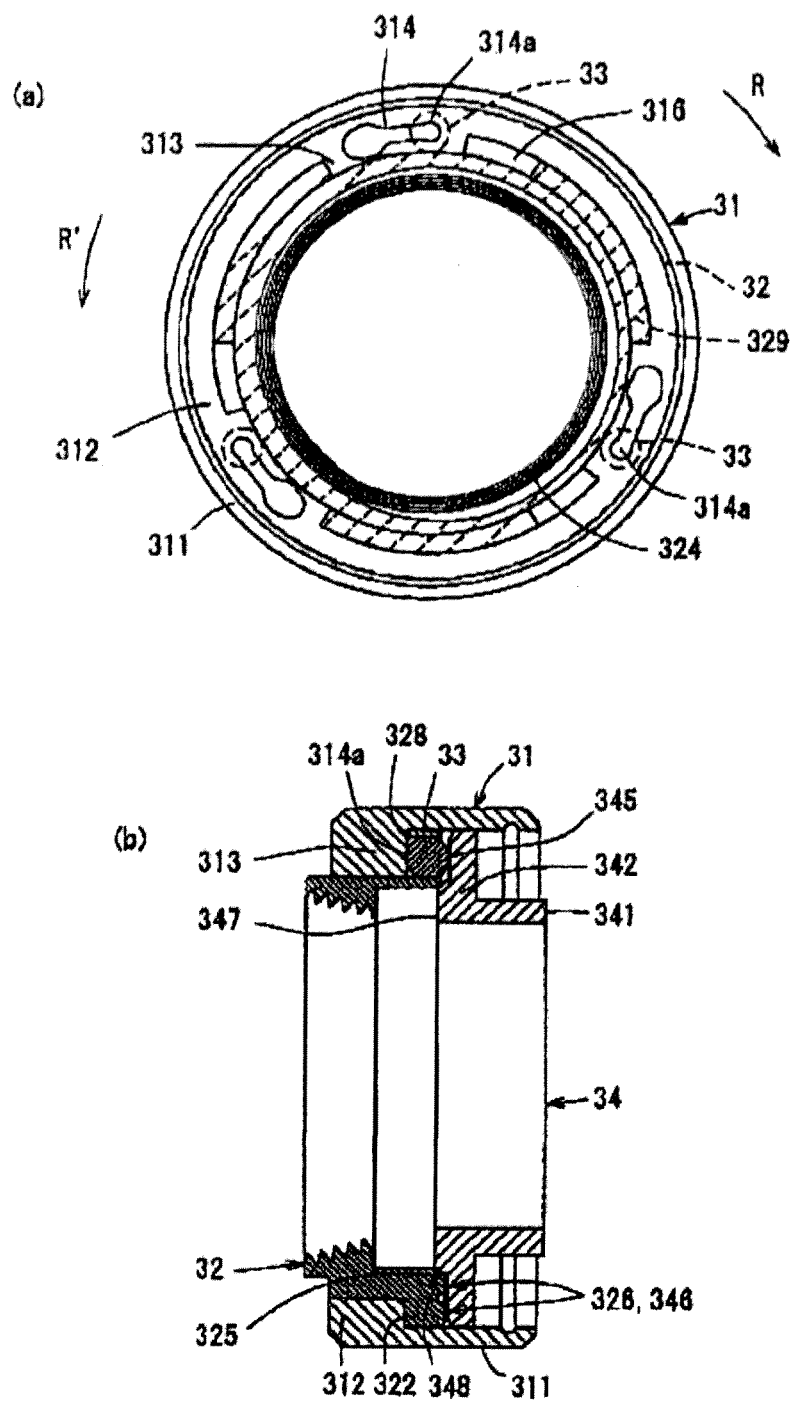
FIG. 9 is an explanatory drawing of the unlocking state of the locking mechanism.
Figure 10:
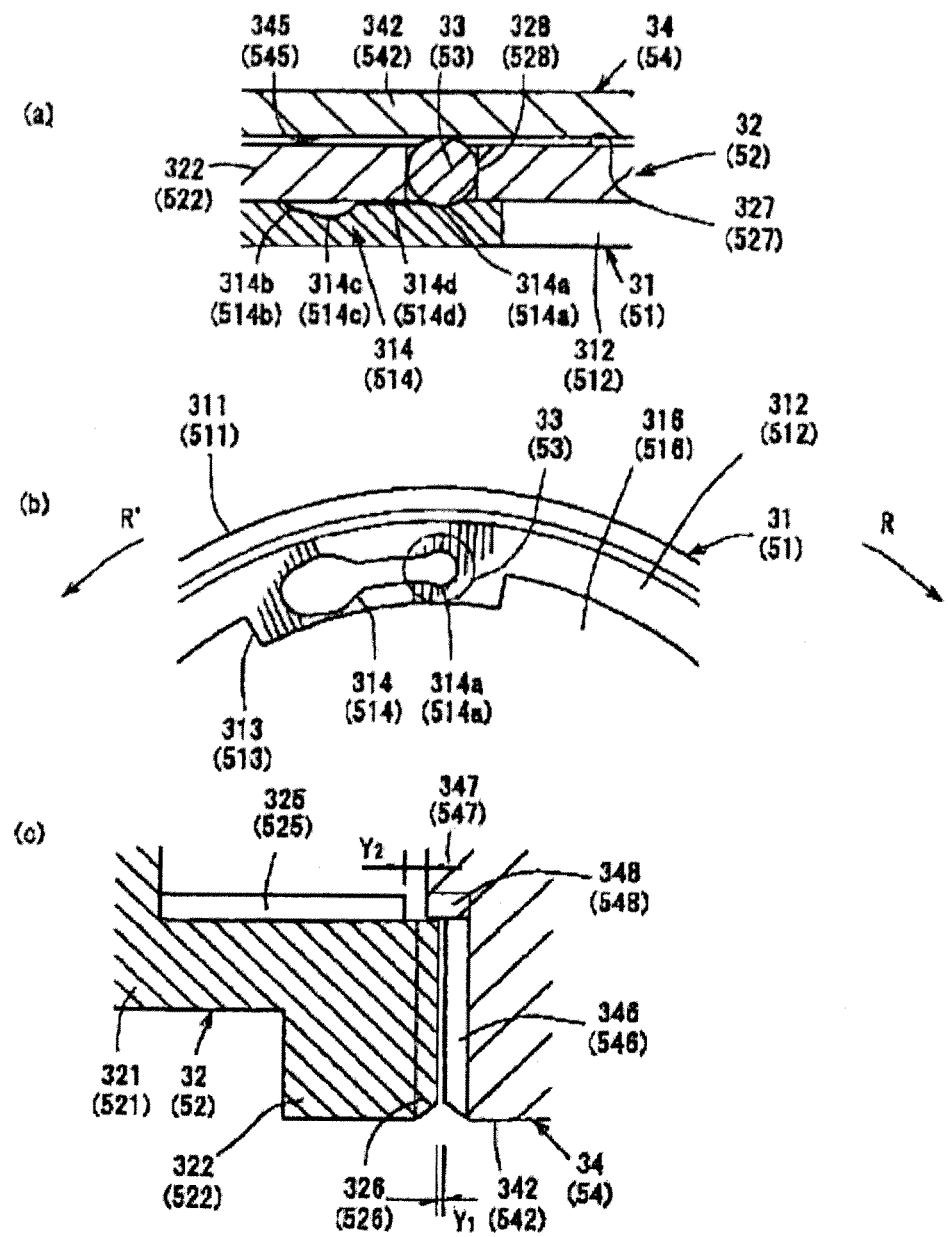
FIG. 10 is an explanatory drawing of the unlocking state concept of the locking mechanism.
Figure 11:
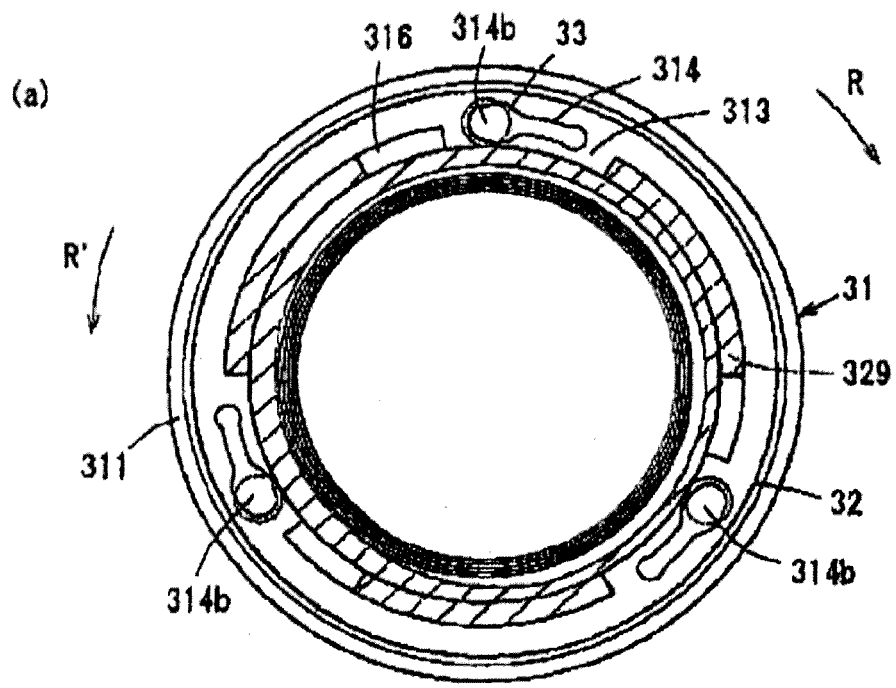
FIG. 11 is an explanatory drawing of the unidirectional locking state of the locking mechanism.
Figure 11:
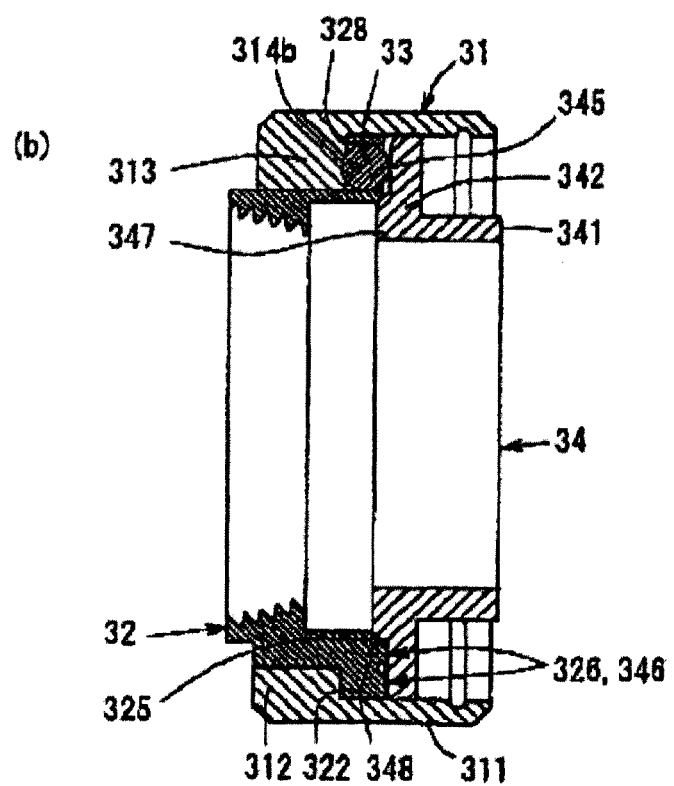
Figure 12:
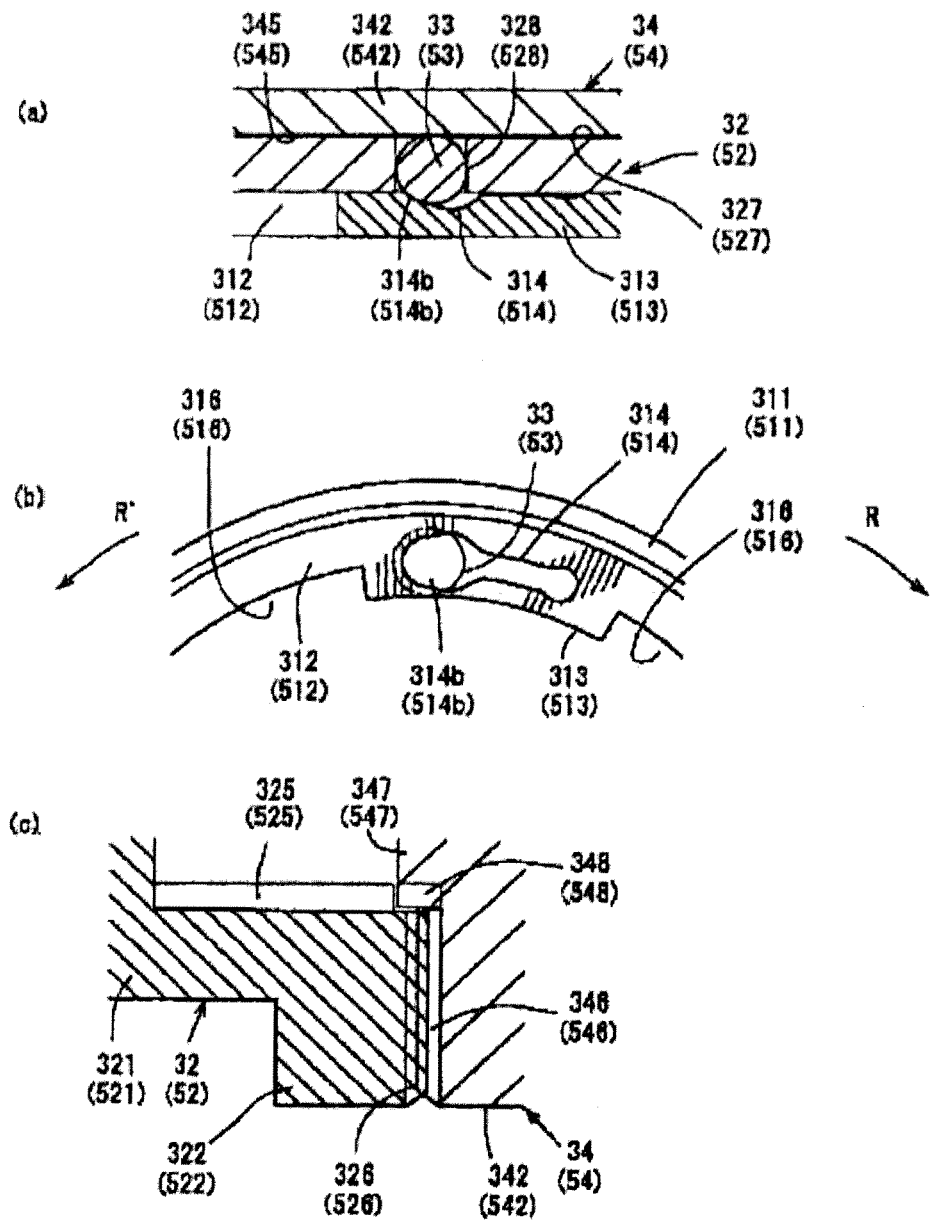
FIG. 12 is an explanatory drawing of the unidirectional locking state concept of the locking mechanism.

Furthermore, FIG. 9 and FIG. 10 show the unlocking state in the rotation control body 30; FIG. 11 and FIG. 12 show the unidirectional locking state and FIG. 13 and FIG. 14 show the explanatory drawing of the locking state.

Figure 14:
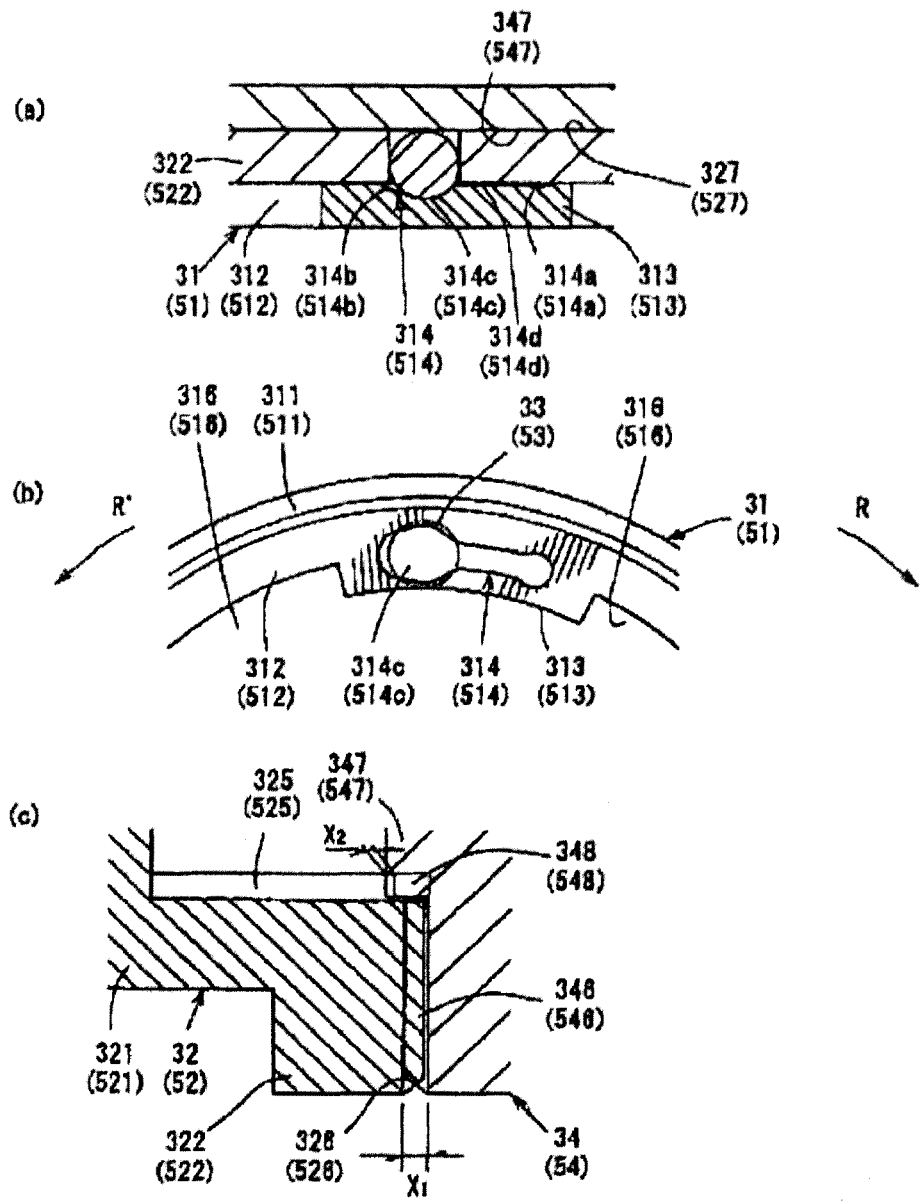
FIG. 14 is an explanatory drawing of the locking state concept of the locking mechanism.

In addition, FIG. 10, FIG. 12 and FIG. 14 show the concept view of individual states.

Figure 13:
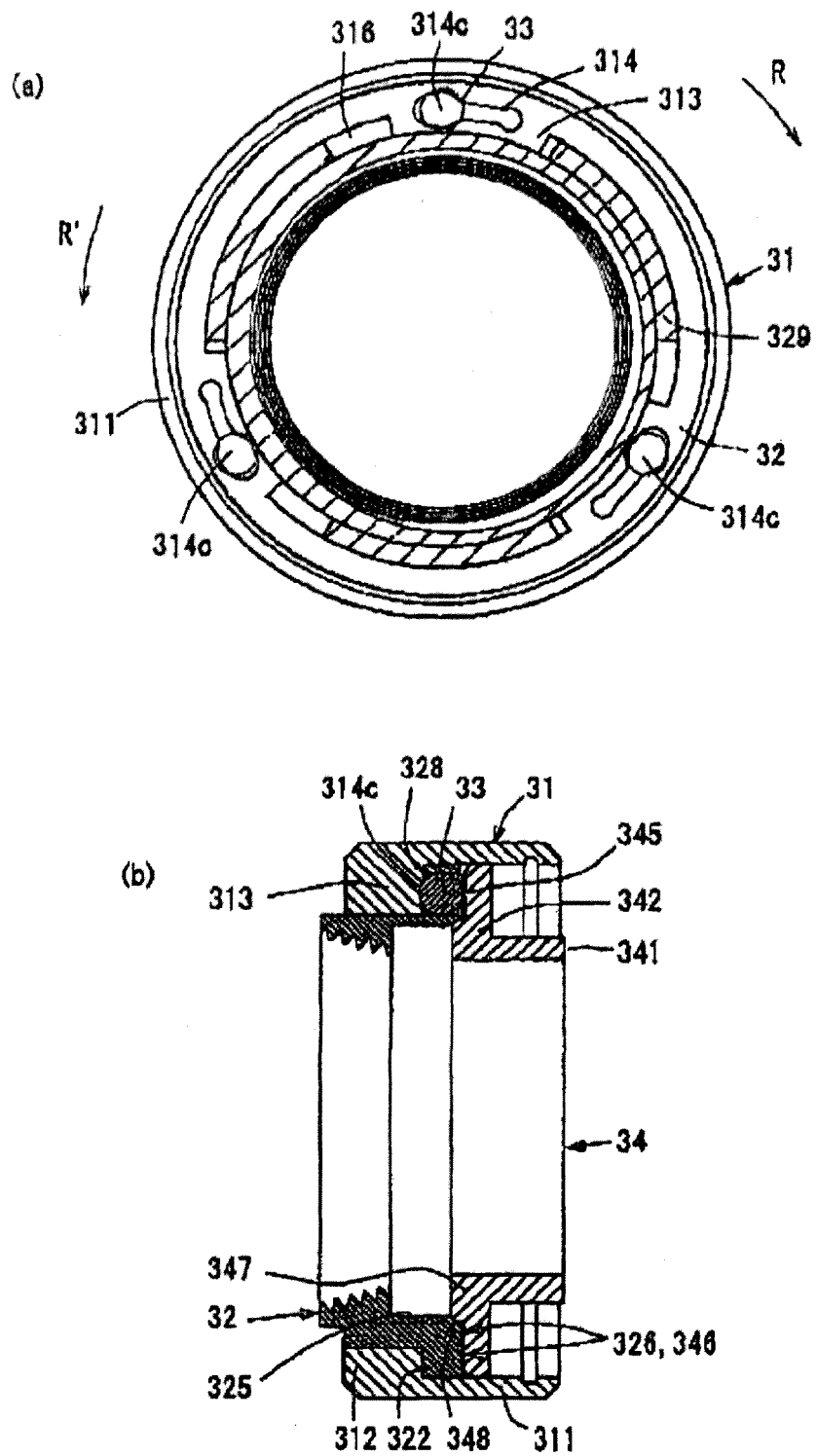
FIG. 13 is an explanatory drawing of the locking state of the locking mechanism.

To be detailed, FIG. 9, FIG. 11 and FIG. 13 (a) show the front view of the rotation control body 30 in each state, and FIG. 13 (b) shows the longitudinal sectional drawing. FIG. 10, FIG. 12 and FIG. 14 (a) show the partial sectional drawing of the guide groove 314 in each state; FIG. 14 (b) shows a partial enlarged front view of the guide groove 314; and FIG. 14 (c) shows an enlarged longitudinal sectional drawing of the gear state of the nut gear 32 and the locking gear 34.

The clamping head device 1 of the present invention is installed at the front end of an electric tool (not shown). For example, the electric tool comprises a shell of a handle part held by a user in use, and a spindle arranged at the front of the shell.

Then, the clamping head device 1 is installed at the front end of the spindle, to fasten and fix the central shaft of the rotation clamp. The spindle is rotated through the rotation driving force of a motor capable of rotating positively and inversely that is arranged inside the shell.

Figure 1:
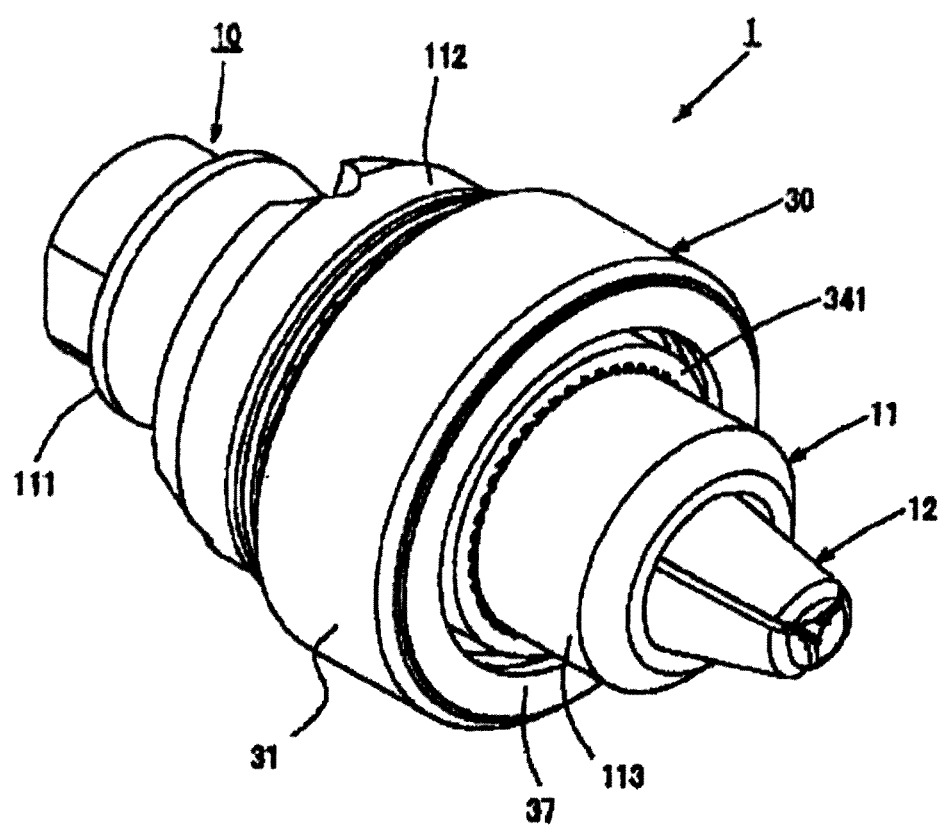
FIG. 1 is a perspective diagram of the clamping head device.
Figure 2:
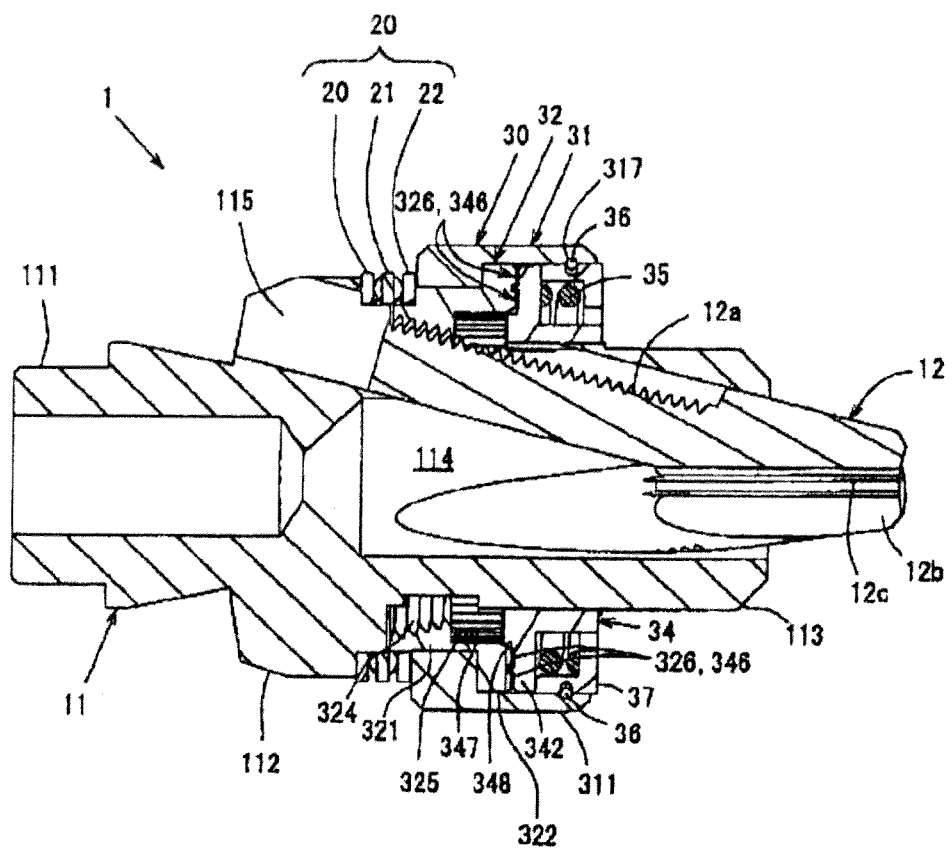
FIG. 2 is a longitudinal sectional drawing of the clamping head device.
Figure 3:
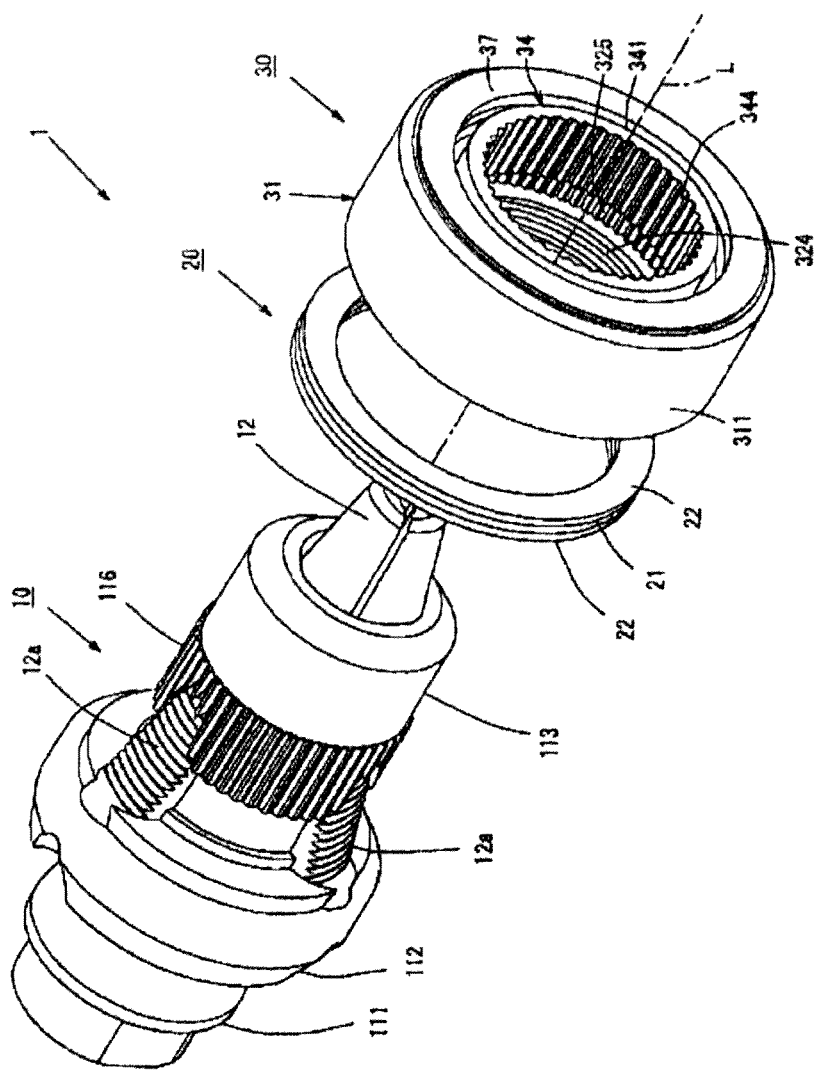
FIG. 3 is a perspective diagram for explaining the assembly of the clamping head device main body and the locking mechanism.

As shown in FIG. 3, the clamping head device 1 installed on the electric tool is composed by the clamping head main body 10 which is the main fitting, the rotation control body 30 and an accessory 20. But the accessory 20 is not necessary for the clamping head device 1, may be a substitute, and can be excluded during realizing the following functions.

As shown in FIG. 4, the clamping head main body 10 is composed of a clamping head disc body 11 and a clamping jaw 12.

The clamping head disc body 11 is composed by a back body part 111, a middle body part 112 and a front body part 113 from the rear direction, and is of a slightly cylinder shape which is provided with an inserting hole 114 in the axle center L direction in the middle of the cylinder.

Furthermore, at the three positions in the circumferential direction of the clamping head disc body 11, three clamping jaw mounting holes 115 which are communicated with the inserting hole 114 are arranged in the direction cross with the axle center L, from the middle body part 112 to the front body part 113, and from the external circumferential side toward the internal circumferential side (as shown in FIG. 4).

Furthermore, the intersection point of the extension lines in the inside diagonal direction of the three clamping jaw mounting holes 115 is located on the axle center L.

In addition, a circumferential surface gear 116 is arranged on the external circumferential surface in the axle center L direction near the middle of the front body part 113.

The clamping jaw 12 is of a slightly cylinder shape, and is provided with a screw groove 12a which is arranged on the rear external lateral surface and is screw joined with the screw groove 324 of the nut ring 32 (illustrated below). And, a press surface 12b, which is slightly parallel with the axle center L in the direction cross with axle center direction of the substrate cylinder shape, is arranged on the front internal circumferential surface of the clamping jaw 12. A carbide-made paster (or patch) 12c is provided in the middle of the width direction of the press surface 12b. As mentioned above, the clamping jaw 12 with the above mentioned structure is configured in three directions of the circumferential direction, and the press surface 12b is parallel with the axle center L.

The clamping jaw 12 is inserted in the clamping jaw mounting hole 115 of the clamping head disc body 11 with the above-mentioned structure, so as to form the clamping head main body 10. At this time, the clamping jaw 12 is inserted in the clamping jaw mounting hole 115 to expose the screw groove 12a to the diameter outside.

As shown in FIG. 4, the accessory 20 is composed of the thrust bearing 21 and two pads 22.

The thrust bearing 21 is composed of a space ring 21b which is the clearance fit with a plurality of bearing balls 21a in the circumferential direction. The pads 22 are a steel-made thin sheet ring body, and have a same diameter with the thrust bearing 21. Furthermore, the accessory 20 is installed on the front body part 113, so that the thrust bearing 21 is clamped by the two pads 22 from front and back directions and resists against the front surface (as shown at the right side of FIG. 4) of the middle body part 112 of the clamping head disc body 11.

As shown in FIG. 4, from the rear of the axle center L, the rotation control body 30 sequentially comprises the nut ring 31, the nut gear 32, the cam ball 33, the locking gear 34, a rotary spring 35, the thread-off proof ring 36 and a spring cap 37.

Figure 7:
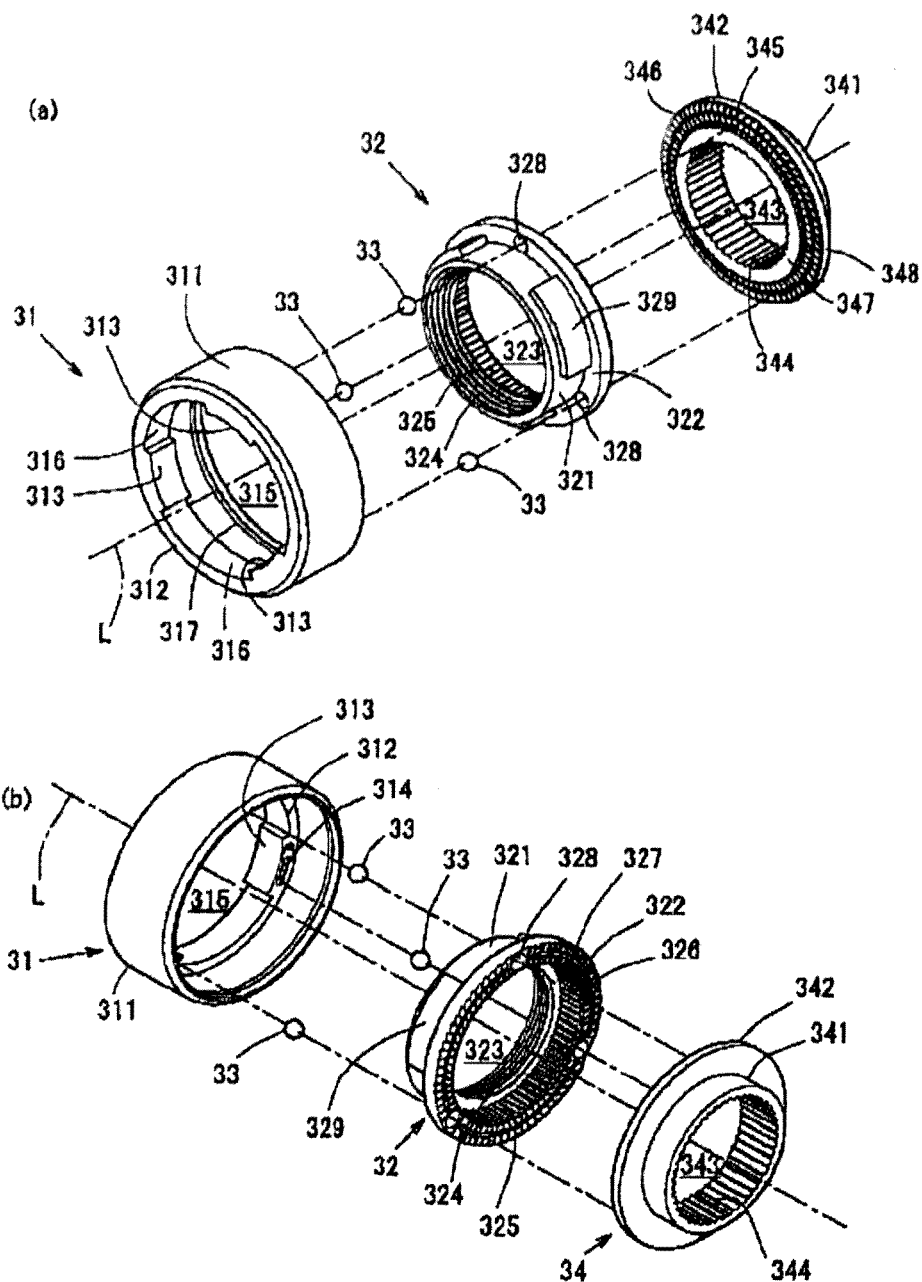
FIG. 7 is an explanatory drawing of the main composing elements of the locking mechanism.

As shown in FIG. 4 and FIG. 7, the nut ring 31 comprises a cylindrical main body 311 which is of a slightly cylinder shape and is provided with a circular opening 315 inside, and a flange part 312 which is arranged on the internal circumferential surface in the back of the cylindrical main body 311 and protrudes to the center, namely the direction of the axle center L.

Furthermore, the nut ring 31 is fixed at the internal side of an external sleeve (not shown in the figure) which is directly operated by the user, and is integrated with the external sleeve.

Furthermore, the protrusion part 313, which protrudes to the center, is arranged at the three positions in the circumferential direction of the flange part 312. In addition, the guide groove 314 which is used for clamping the cam ball 33 is arranged in the front of the protrusion part 313 (as shown at the right side of FIG. 4). Furthermore, clearance fit convex parts 329 is in clearance fit with the clearance fit concave parts 316 in the circumferential direction, with clearance fit convex parts 329 forming the nut gear 32 between the protrusion parts 313.

In addition, a clamping groove 317 which is used for clamping the thread-off proof ring 36 is arranged on the front internal circumferential surface in the axle center L direction of the cylindrical main body 311.

Furthermore, as shown in FIG. 8 (a), the guide groove 314 is formed by a groove which has a circular arc-shaped section, comprising an unlocking position concave part 314a arranged in the front end of the fastening rotation direction R (clockwise rotation direction on front face), a unidirectional locking position concave part 314b arranged in the back end of the fastening rotation direction R, a locking position concave part 314c arranged in the front of the unidirectional locking position concave part 314b in the fastening rotation direction R, and a connecting groove part 314d for connecting the above-mentioned parts.

To be detailed, the unlocking position concave part 314a, the unidirectional locking position concave part 314b, the locking position concave part 314c and the connecting groove part 314d of the guide groove 314 are arranged on a same circle.

As shown in FIG. 8 (b), measuring from the surface, the depths of the unlocking position concave part 314a, the unidirectional locking position concave part 314b and the locking position concave part 314c are respectively ta, tb and tc, and simultaneously ta<tb<tc. That is to say, relatively to the connecting groove part 314d, the depths are deeper and deeper by the sequence of the unlocking position concave part 314a, the unidirectional locking position concave part 314b and the locking position concave part 314c.

Thereby, as shown in FIG. 8 (c), the press amount pa by which the cam ball 33 clamped in the unlocking position concave part 314a presses the locking gear 34 equals to the difference between the depth ta of the unlocking position concave part 314a and the depth tc of the locking position concave part 314c, namely the movement amount from the cam ball 33 clamped in the locking position concave part 314c by the most depth t to the axle center L direction.

Similarly, the press amount pb by which the cam ball 33 clamped in the unidirectional locking position concave part 314b presses the locking gear 34 equals to the difference between the depth tb of the unidirectional locking position concave part 314b and the depth tc of the locking position concave part 314c.

Furthermore, the press amount pc of the cam ball 33 clamped in the locking position concave par 314c by the most depth t is set as zero in the present embodiment.

As shown in FIG. 4 and FIG. 7, the nut gear 32 is provided with a slightly cylindrical nut main body 321 and a flange disc part 322 arranged in the front of the nut main body 321. A circular opening 323, which penetrates from the front to the back and is of a circular shape observed from the front face, is arranged inside the nut gear 32.

Furthermore, the diameter of the nut main body 321 is designed such that the circular opening 315 can be embedded inside the diameter of the protrusion part 313. And the flange disc part 322 is provided with the diameter such that the flange disc part can be embed inside the diameter of the cylindrical main body 311.

On the internal circumferential surface of the nut main body 321 which is provided with the circular opening 323, the screw groove 324 is provided with the diameter increasingly decreased toward the axle center L direction (with the small front end) and meshed with the screw groove 12a of the clamping jaw 12.

An internal circumferential surface mesh gear 325 which protrudes to the circular opening 323 is arranged in the front in the axle center L direction of the screw groove 324 arranged on the internal circumferential surfaces of the nut main body 321 and the flange disc part 322. Furthermore, the gear teeth direction of the internal circumferential surface mesh gear 325 is parallel with the axle center L direction.

In the front of the flange disc part 322, a slightly actinomorphic ratchet 326 is arranged in the gear teeth direction. Moreover, an insetting groove 327 which is of a slightly circular shape observed from the front face is arranged near the center of the radial direction of the slightly actinomorphic ratchet arranged in the gear teeth direction (with reference to the partial enlarged view of FIG. 4a).

Furthermore, a guiding limitation hole 328 which fits with the cam ball 33 with clearances and is used for clamping the guide groove 314 is arranged at the position opposite to the flange disc part 322 and the guide groove 314.

In addition, a clearance fit convex part 329 is arranged at three positions in the radial direction between the guiding limitation holes 328 which are arranged on the external circumference of the nut main body 321. The clearance fit convex parts 329 protrude outside the diameter, and in clearance fit with the clearance fit concave parts 316 in the circumferential direction.

The cam balls 33 which are clamped in the guide grooves 314 and simultaneously in the clearances fit with the guiding limitation holes 328 are steel balls whose number is three, which is same with the quantity of the guide grooves 314 and the guiding limitation holes 328 arranged at three positions in the circumferential direction.

As shown in FIG. 4 and FIG. 7, the locking gear 34 is provided with a cylindrical main body 341 which is of a slightly cylinder shape, a flange disc part 342 arranged at the hack end of the cylindrical main body 341, and a back tee ring protrusion part 347 which protrudes backward a little along the edge of the internal circumference of the flange disc part 342 and is of a ring shape observed from the rear direction. A circular opening 343 which penetrates from the front to the back and is of a circular shape observed from the front face is arranged inside the cylindrical main body 341. Moreover, the diameter of the back face ring protrusion part 347 is designed so as to be inset in the circular opening 323 of the nut gear 32.

An internal circumferential surface gear 344 which is meshed with the circumferential surface gear 116 of the clamping head disc body 11 is arranged on the internal circumferential surface of the cylindrical main body 341 which is provided with the circular opening 343.

A ratchet 346 which is meshed with the ratchet 326 arranged on the flange disc part 322 is arranged in the back of the flange disc part 342. Furthermore, in virtue of the mesh between the ratchet 326 arranged on the flange disc part 322 and the ratchet 346 arranged on the flange disc part 342, the rotation in the direction opposite to the rotation direction of the relative fastening rotation direction R, namely the rotation to the unfastening rotation direction, can be restricted (with reference to FIG. 8 (a)).

Furthermore, an external circumferential surface mesh gear 348 which is meshed with the internal circumferential surface mesh gear 325 is arranged on the external circumferential surface of the back face ring protrusion part 347. The gear teeth direction of the external circumferential surface mesh gear 348 is parallel with the axle center L direction, and is provided with the gear teeth width in accordance with the protruding amount from the flange disc part 342 to the back face ring protrusion part 347 (with reference to the partial enlarged view of FIG. 4b).

In addition, an insetting convex part 345 which is inset in the insetting groove 327 and is of a slightly circular shape observed from the back face is arranged near the middle of the radial direction of the slightly actinomorphic ratchet 346 arranged in the gear teeth direction (with reference to the partial enlarged view of FIG. 4c).

Furthermore, the insetting convex part 345 is arranged at the position in the radical direction from the axle center L which shares a same center with the cam ball 33 which is in clearance fit with guiding limitation hole 328.

The rotary spring 35 is a coil spring which biases the locking gear 34 against the nut gear 32 as the reaction force of the spring cap 37 (described later).

The thread-off proof ring 36 can be formed by an elastic body which is of a slightly C-shape observed from the front face and can be inset in the insetting groove 37a arranged on the external circumferential surface of the spring cap 37.

The spring cap 37 is a ring body formed with specified thickness, and is provided with the insetting groove 37a for insetting the thread-off proof ring 36 on the external circumferential surface, and an insetting space 37b for insetting the rotary spring 35 in the ring body.

As mentioned above, the nut ring 31, the nut gear 32, the cam ball 33, the locking gear 34, the rotary spring 35, the thread-off proof ring 36 and the spring cap 37 are assembled to form the rotation control body 30 (with reference to FIG. 6). To be detailed, the ratchet 326 of the flange disc part 322 and the ratchet 346 of the flange disc part 342 are arranged oppositely in the axle center L direction; and the locking gear 34 and the nut gear 32 with the guiding limitation hole 328 inserted with the cam ball 33 are inserted in the circular opening 315 of the nut ring 31.

At this time, the clearance fit convex part 329 of the nut gear 32 is in clearance fit with the clearance fit concave parts 316 arranged between the protrusion parts 313 of the nut ring 31. In addition, the external circumferential surface mesh gear 348 formed on the back face ring protrusion part 347 and the internal circumferential surface mesh gear 325 formed on the nut gear 32 are arranged oppositely and are meshed with each other in the radial direction.

Furthermore, in the state that the clearance fit convex part 329 is in clearance fit with the clearance fit concave parts 316, the guide groove 314 arranged on the protrusion part 313 is arranged oppositely to the guiding limitation hole 328 in the axle center L direction. In addition, the cam ball 33 inserted in the guiding limitation hole 328 is clamped from the front and back directions in the axle center L direction by the guide groove 314 and the insetting convex part 345 of the locking gear 34.

Further, from the front of the locking gear 34, the rotary spring 315 is inserted into the circular opening 315, and the spring cap 37 of the thread-off proof ring 36 is inset in the insetting groove 37a, so that the thread-off proof ring 36 can be clamped in the clamping groove 317.

Thereby, at the circular opening 315, the spring cap 37 is restricted in the axle center L direction due to the thread-off proof ring 36 clamped in the clamping groove 317. As a result, with the spring cap 37 as the reaction force, the rotary spring 35 biases the locking gear 34 against the nut gear 32, namely biasing toward the rear direction of the axle center L direction.

Through the biasing force of the rotary spring 35, the ratchet 346 of the locking gear 34 and the ratchet 326 of the nut gear 32 are meshed with each other; and the internal circumferential surface mesh gear 325 and the external circumferential surface mesh gear 348 are arranged oppositely in the radial direction and are meshed with each other.

The meshes in the rotation control body 30 with the above mentioned structure between the ratchet 346 of the locking gear 34 and the ratchet 326 of the nut gear 32, and between the internal circumferential surface mesh gear 325 and the external circumferential surface mesh gear 348 will be detailed hereafter according to its relation with the press amount of the cam ball 33 locked in the guide groove 314.

As mentioned above, the height direction of the gear teeth of the ratchets 326 and 346 is consistent with the axle center L direction. Therefore, the switching can be performed between the mesh and separation of the ratchets 326 and 346 according to the position of the locking gear 34 in the axle center L direction which is restricted by the cam ball 33.

On the other hand, the gear teeth direction of the circumferential surface mesh gears 325 and 348 which are meshed with each other in the radial direction is the radial direction. Therefore, according to the position of the locking gear 34 in the axle center L direction which is restricted by the cam ball 33, the internal circumferential surface mesh gear 325 slides to the axle center L direction relatively to the external circumferential surface mesh gear 348, and the mesh and separation of the circumferential surface mesh gears 325 and 348 can be switched.

Among the unidirectional locking position concave part 314b, the locking position concave part 314c, and the unlocking position concave part 314a of the guide groove 314 in which the cam ball 33 for restricting the position of the locking gear 34 in the axle center L direction is locked, at the unlocking position concave part 314a whose height t is smallest, the ratchets 326 and 346 meshed in the axle center L direction, and the circumferential surface mesh gears 325 and 348 meshed in the radial direction are both separated, as shown in FIG. 9 and FIG. 10. To be detailed, the depth t of the unlocking position concave part 314a is smallest at the guide groove 314, so the position in the axle center L direction of the cam ball 33 which is locked in the unlocking position concave part 314a becomes the front side (the up and down direction is upper direction of the axle center L as shown in FIG. 10 (a)).

Thereby, the cam ball 33, against the biasing force of the rotary spring 35, presses the insetting convex part 345 toward the front of the axle center L direction. In other words, the press amount p applied on the insetting convex part 345 by the cam ball 33 which is locked in the unlocking position concave part 314a is more than the press amount when the cam ball 33 is located at the locking position concave part 314c, so that the ratchets 326 and 346 meshed in the axle center L direction, and the circumferential surface mesh gears 325 and 348 meshed in the radial direction are both separated. In this case, the nut gear 32 and the locking gear 34 come into the unlocking state in which the nut gear 32 and the locking gear 34 can rotate relatively.

On the other hand, when the can ball 33 is locked in the locking position concave part 314c which is the deepest, as shown in FIG. 13 and FIG. 14, the ratchets 326 and 346 meshed in the axle center L direction, and the circumferential surface mesh gears 325 and 348 meshed in the radial direction are meshed with each other.

To be detailed, the depth t of the locking position concave part 314e is the deepest at the guide grove 314, so the position in the axle center L direction of the cam ball 33 which is locked in the locking position concave part 314c becomes the back side (the up and down direction is down direction of the axle center L as shown in FIG. 14 (a)).

Thereby, the phenomenon that the cam ball 33, presses the insetting convex part 345 toward the front of the axle center L direction against the biasing force of the rotary spring 35 will not occur. Therefore, through the biasing force of the rotary spring 35, the ratchets 326 and 346 in the axle center L direction, and the circumferential surface mesh gears 325 and 348 in the radial direction are both meshed with each other. In this case, the nut gear 32 and the locking gear 34 come into the locking state in which the rotation thereof is fixed.

When the cam ball 33 is locked in the unidirectional locking position concave part 314b which is deeper than the unlocking position concave part 314a and shallower than the locking position concave part 314c, as shown in FIG. 11 and FIG. 12, the ratchets 326 and 346 in the axle center L direction are meshed with each other, and the circumferential surface mesh gears 325 and 348 in the radial direction are separated with each other.

To be detailed, the depth tb of the unidirectional locking position concave part 314b is deeper than that of the unlocking position concave part 314a which is separated along with the unidirectional locking position concave part 314b, and is shallower than that of the locking position concave part 314c which is meshed along with the unidirectional locking position concave part 314b, so the position in the axle center L direction of the cam ball 33 which is locked in the unidirectional locking position concave part 314b becomes the middle position.

Thereby, the cam ball 33, against the biasing force of the rotary spring 35, presses a little the insetting convex part 345 toward the front of the axle center L direction. In other words, the press amount p applied on the insetting convex part 345 by the cam ball 33 which is locked in the unidirectional locking position concave part 314b is greater than the press amount when the cam ball 33 is locked in the locking position concave part 314c, but is less than the press amount pa of the cam ball 33 locked in unlocking position concave part 314a.

Therefore, the ratchets 326 and 346 in the axle center L direction are meshed with each other, and the circumferential surface mesh gears 325 and 348 in the radial direction are separated with each other. In this case, the ratchets 326 and 346 in the axle center L direction are provided with the pawl shape in which the rotation toward the unfastening rotation direction R' has been restricted. As a result, the nut gear 32 and the locking gear 34 are in the unidirectional locking state in which only unidirectional relative rotation in the fastening rotation direction R can be allowed.

In addition, in order to restrict the mesh and separation between the ratchets 326 and 346 in the axle center L direction and between the circumferential surface mesh gears 325 and 348 in the radial direction according to the press amount p applied on the insetting convex part 345 by the cam ball 33 which is in the locking position of the guide groove 314, the present invention specifies the following relations.

First of all, the ratchets 326 and 346 in the axle center L, direction are configured as follows: as shown in FIG. 14 (c), in the locking state that the ratchets 326 and 346 in the axle center L direction and the circumferential surface mesh gears 325 and 348 in the radial direction are both meshed with each other, the gear mesh height X1 of the ratchets 326 and 346 in the axle center L direction, namely the height of the overlapped part of the ratchets 326 and 346 in mesh state in the axle center L direction, is lower than the depth difference (tc-ta) between the unlocking position concave part 314a with the maximum press amount p and the locking position concave part 314c with the minimum press amount p, namely the difference between the press amounts (pa-pc).

In addition, as shown in FIG. 10 (c), in the unlocking state that the ratchets 326 and 346 in the axle center L direction and the circumferential surface mesh gears 325 and 348 in the radial direction are both separated with each other, the separation distance Y1 of the ratchets 326 and 346 in the axle center L direction is set shorter than the depth difference (tb-ta) between the unlocking position concave part 314a with the maximum press amount p and the unidirectional locking position concave part 314b whose the press amount p forming the unidirectional locking state, namely the difference between the press amounts (pa-pb).

Furthermore, the circumferential surface mesh gears 325 and 348 in the radial direction are configured as follows:

As shown in FIG. 14 (c), in the locking state, it is configured that the gear mesh width X2 of the circumferential surface mesh gears 325 and 348 in the axle center L direction, namely the width of the overlapped part of the circumferential surface mesh gears 325 and 348 in mesh state in the axle center L direction, is smaller than the depth difference (tc-tb) between the unidirectional locking position concave part 314b whose the press amount p forming the unidirectional locking state and the locking position concave part 314c with the minimum press amount p, namely the difference between the press amounts (pb-pc).

In addition, as shown in FIG. 10 (c), in the unlocking state, it is configured that the separation distance Y2 of the circumferential surface mesh gears 325 and 348 in the axle center L direction is set shorter than the depth difference (tc-ta) between the unlocking position concave part 314a with the maximum press amount p and the locking position concave part 314c with minimum press amount p, namely the difference between the press amounts (pa-pc)

As mentioned above, through setting the ratchets 326 and 346 in the axle center L direction, the circumferential surface mesh gears 325 and 348 in the radial direction and the depth t of individual guide grooves 314 (namely the press amount p), the mesh and separation between the ratchets 326 and 346 in the axle center L direction and between the circumferential surface mesh gears 325 and 348 in the radial direction can be switched using the cam ball 33 locked in the guide groove 314.

As shown in FIG. 3, by assembling the composing elements as above, the clamping head main body 10 and the rotation control body 30 are formed with the accessory 20 therebetween, therefore the clamping head device 1 is formed.

At this time, the internal circumferential surface gear 344 of the rotation control body 30 is meshed with the circumferential surface gear 116 of the clamping head disc body 11. Furthermore, the screw groove 324 of the rotation control body 30 is screw-joined with the screw groove 12 of the clamping jaw 12 of the clamping head main body 10. Therefore, due to the mesh between the internal circumferential surface gear 344 and the circumferential surface gear 116, the rotation of the locking gear 34 of the rotation control body 30 toward the rotation directions R and R' is restricted relatively to the clamping head main body 10, and the slide toward the axle center L direction can be performed.

In this case, through rotating the rotation control body 30 toward the fastening rotation direction R, due to the three clamping jaws 12 wherein the screw groove 324 of the nut gear 32 is screw joined with the screw groove 12a, the clamping jaw mounting holes 115 move forward to the axle center L synchronously.

Furthermore, the central shaft of the drill clamp (not shown) can be fixed in the fastening fixing state of being pressed by the press surface 12b, through the pasters 12c from three directions outside the diameter.

In the fastening fixing state, the rotation of the nut gear 32, which is screw-joined with the screw groove 12a of the clamping jaw 12 with the central shaft having been fasten, is fixed, so the external sleeve (not shown) rotates the nut ring 31 toward the fastening rotation direction R, and the nut ring 31 performs differential rotation to the front of the fastening rotation direction R relatively to the nut gear 32.

As shown in FIG. 11 (a) and FIG. 12, the nut ring 31 performs differential rotation to the front of the fastening rotation direction R relatively to the nut gear 32, with the result that the cam ball 33, which is clearance-fit in the guiding limitation hole 328 of the nut gear 32 rotatably fixed, moves to the unidirectional locking position concave part 314b of the guide groove 314.

As shown in FIG. 12 (c), the ratchets 326 and 346 in the axle center L direction are meshed with each other, and the circumferential surface mesh gears 325 and 348 in the radial direction are separated with each other, with the result that the cam ball 33 clamped in unidirectional locking position concave part 314b comes into the unidirectional locking state in which the nut gear 32 and the locking gear 34 can only rotate to the fastening rotation direction R.

In this case, as shown in FIG. 11 (a), the front sideface in the fastening rotation direction R of the protrusion part 313 is connected with the back sideface in the fastening rotation direction R of the clearance fit convex part 329. Therefore, the nut ring 31 rotates to the fastening rotation direction R through the external sleeve (not shown), to screw the nut gear 32 into the clamping jaw 12 toward the fastening direction. However, because the ratchets 326 and 346 in the axle center L direction are meshed with each other, the rotation in the unfastening rotation direction R' is restricted and the fastening fixing state is locked.

Furthermore, in the above unidirectional locking state, as shown in FIG. 12 (c), the ratchets 326 and 346 are meshed at the middle positions of the gear teeth height. Therefore, in the unidirectional locking state, the operation performed by the external sleeve is stopped, in other words, the rotation operation toward the fastening rotation direction R is stopped, such that the locking gear 34 is biased to the nut gear 32 by the rotary spring 35, with the result that it is switched to the locking state automatically. In the locking state, the ratchets 326 and 346 abut against each other because of the biasing force of the rotary spring 35.

To be detailed, by force of the biasing force of the rotary spring 35, the nut gear 32 performs differential rotation to the unfastening rotation direction R' relatively to the nut ring 31, so that the ratchets 326 and 346 abut against each other and the cam ball 33 clamped in the unidirectional locking position concave part 314b moves to the locking position concave part 314c.

In this way, the cam ball 33 is clamped in the locking position concave part 314c, and the ratchets 326 and 346 abut against each other, with the result that the circumferential surface mesh gears 325 and 348 in the radial direction are also meshed with each other, and it comes into the locking state, as shown in FIG. 14(c).

In this case, besides that the ratchets 326 and 346 in the axle center L direction are meshed with each other, the circumferential surface mesh gears 325 and 348 in the radial direction are also meshed with each other. Therefore, the rotations in both the fastening rotation direction R and the unfastening rotation direction R' are restricted, and the hastening fixing state of the clamping head device 1 is locked.

When the clamping head device 1 in the fastening fixing state and the central shaft fastened by clamping jaws 12 are unlocked and the rotary clamp is dismounted, the nut ring 31 rotates to the unfastening rotation direction R' through the external sleeve (not shown). At this time, the rotation control body 30 is in the locking state, so the nut ring 31 performs differential rotation to the unfastening rotation direction R' relatively to the nut gear 32.

As a result of the differential rotation performed by the nut ring 31 relatively to the nut gear 32, the cam ball 33 clamped in the locking position concave part 314c moves to the unlocking position concave part 314a through the guiding limitation hole 328 of the nut ring 31 performing the differential rotation.

The cam ball 33, which is clamped in the unlocking position concave part 314a and has the press amount pa, presses and moves the locking gear 34 to the front of the axle center L against the biasing force of the rotary spring 35. Under the press effect of the cam ball 33, as shown in FIG. 10 (c), the ratchets 326 and 346 in the axle center L direction and the circumferential surface mesh gears 325 and 348 in the radial direction are separated. Therefore, the locking state of the rotation control body 30 is unlocked, and the nut gear 32 and the locking gear 34 come into the unlocking state of allowing relative rotation.

Through unlocking the locking state of the rotation control body 30, the nut ring 31 rotates to the unfastening rotation direction R'. Therefore, as shown in FIG. 9 (a), in virtue of the differential rotation to the unfastening rotation direction R', the front sideface in the unfastening rotation direction R' of the protrusion part 313 is connected with the back sideface in the fastening rotation direction R' of the clearance fit convex part 329. Therefore, the nut gear 32 in which the screw groove 324 is screw-joined in the screw groove 12a of the clamping jaws 12 rotates to the unfastening rotation direction R', so that the fastening state of the rotary tool basic shaft performed by the clamping jaws 12 can be unlocked.

Furthermore, in the unlocking state, the cam ball 33 clamped in the unlocking position concave part 314a presses the insetting convex part 345 of the locking gear 34 toward the front of the axle center L direction, and when observed from the back face, the spherical cam ball 33 rolls on the surface of the insetting convex part 345 of circular shape.

Thereby, as for the nut gear 32 which performs relative rotation relative to the locking gear 34, the cam ball 33 in the above-mentioned state plays the role of the bearing, so that the rotary load caused by the relative rotation can be reduced and the rotation to unfastening rotation direction R' can be performed easily, wherein the locking gear 34 can not rotate on the clamping head disc body 11.

Figure 15:
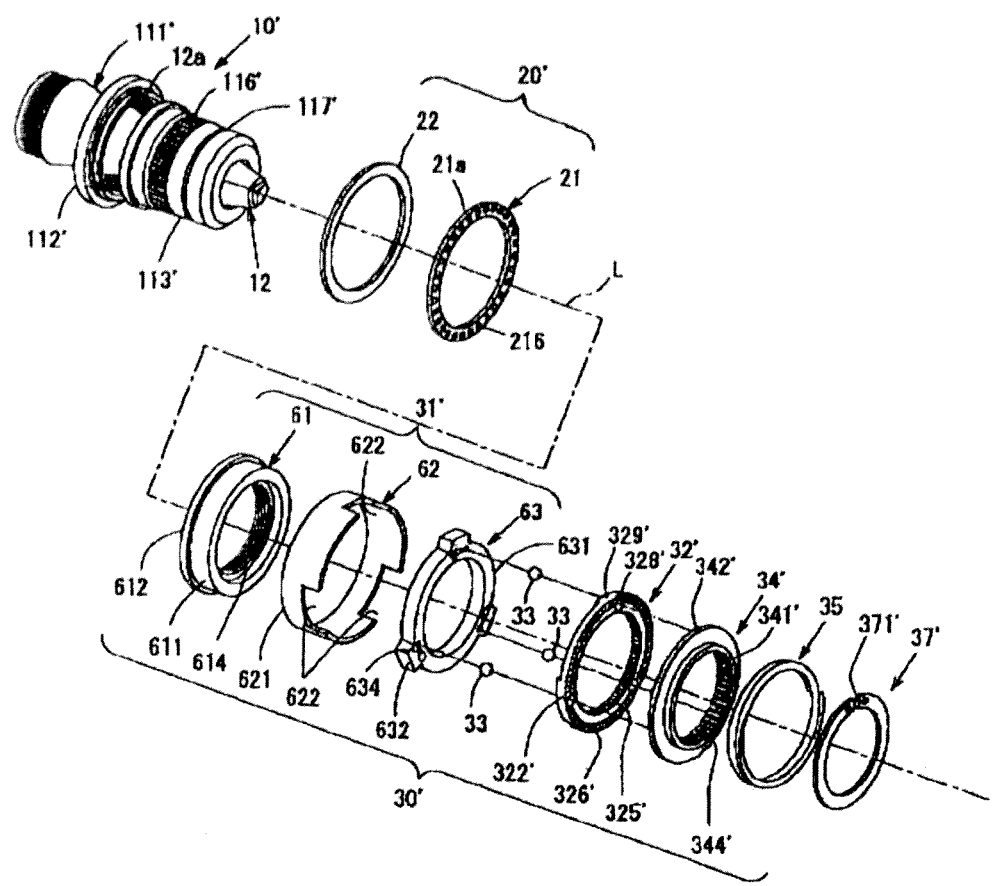
FIG. 15 is an exploded perspective diagram of individual composing elements of the locking mechanism in the clamping head device with the other structures.
Figure 16:
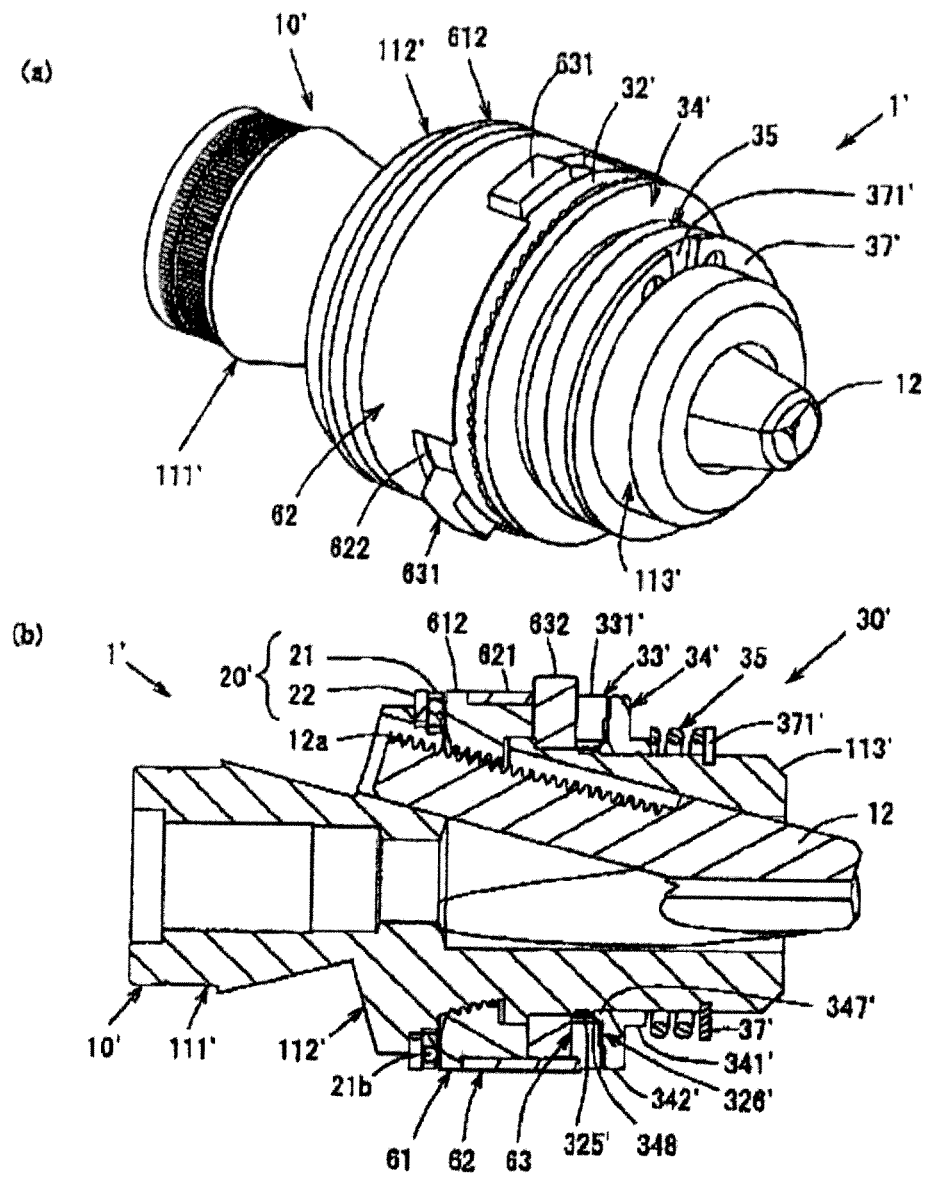
FIG. 16 is an explanatory drawing of the clamping head device with the other structures.

Next, on the basis of the FIG. 15 and FIG. 16, the clamping head device 1' having a rotation control body 30' in the other construction will be detailed hereafter. Furthermore, FIG. 16 (a) is a perspective diagram of the clamping head device 1', and FIG. 16 (b) is a longitudinal sectional drawing.

The clamping head device 1' is composed of a clamping head main body 10', an accessory 20' and the rotation control body 30'. The most significant difference between the clamping head device 1' and the clamping head device 1 is: the nut ring 31, which is an integrated part in the clamping head device 1, is composed of a plurality parts in the clamping head device 1'. Furthermore, the nut ring 31' is provided with the screw groove 324 that the above nut gear 32 possesses.

Furthermore, the rotation control body 30 is formed by assembling the nut gear 32, the locking gear 34, the rotary spring 35, the thread-off proof ring 36 and the spring cap 37 in the nut ring 31. But the rotation control body 30' in the present embodiment is installed at the clamping head main body 10'.

To be detailed, as shown in FIG. 16 (b), the clamping head main body 10' is composed of a clamping head disc body 11' and the clamping jaws 12.

Figure 5:
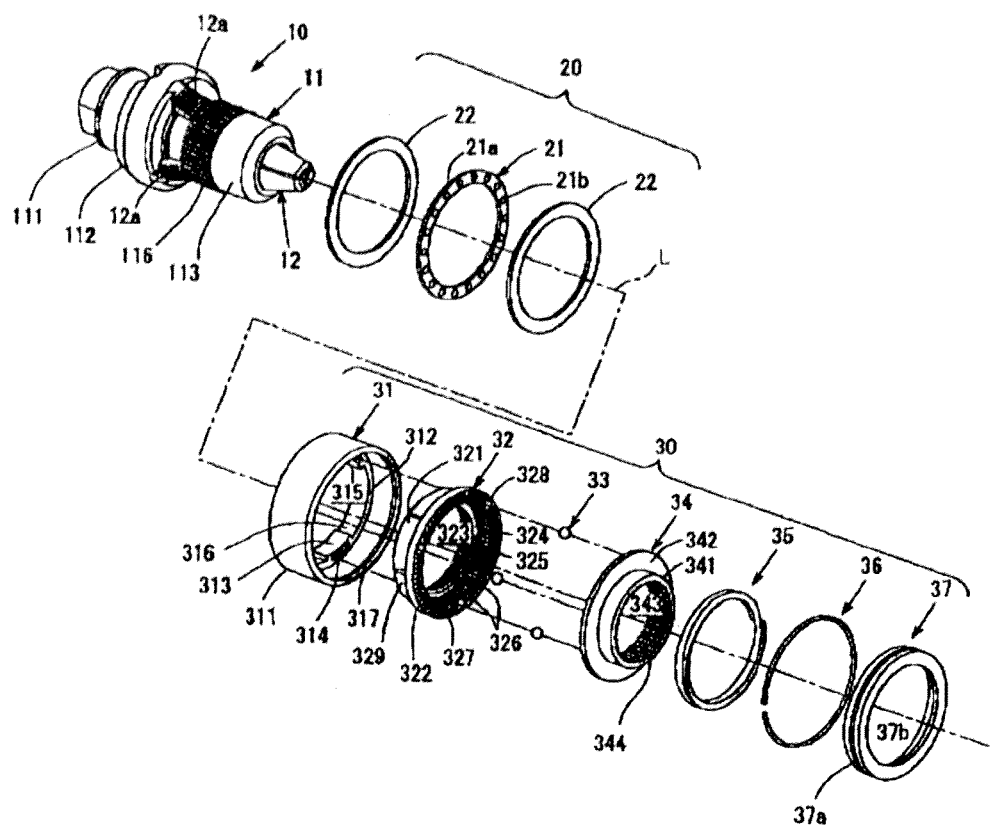
FIG. 5 is an exploded perspective diagram of individual composing elements of the locking mechanism in the clamping head device.

As shown in FIG. 5, the clamping head disc body 11' comprises a back body part 111', a middle body part 112' and a front body part 113' from back to front, and is formed with a slightly cylinder shape having an circumferential surface gear, on the circumference in the back of the front body part 113'. The other parts, the inserting hole 114, the clamping jaw mounting holes 115, or the clamping jaws 12 are the same with those of the clamping head main body 10, so unnecessary details will not be given here any more.

Added to this, a limit ring clamping groove 117' for allowing the clamping of the limit ring 37' of the rotation control body 30' is arranged in the front of the front body part 113' of the clamping head disc body 11'. The limit ring clamping groove 117' has the same functions with the clamping groove 317 of the nut ring 31 of the rotation control body 30.

The accessory 20' is composed of the pad 22 and the thrust bearing 21 of the accessory 20. The differences between the accessory 20 and the accessory 20' are as follows: in the accessory 20, the thrust bearing 21 is clamped by the pads 22 from the front and the back in the axle center L direction, so that the bearing effect can be ensured; while in the accessory 20', the bearing ball 21a installed on the thrust bearing 21 rolls between the pad 22 and the flange disc part 612 which forms the nut main body 61 of the nut ring 31', so that the pad 22 in the front of the axle center L direction is omitted structurally.

The rotation control body 30' is composed of the nut ring body 31', the nut gear 32', the cam ball 33, the locking gear 34', the coil spring 35' and the limit spring 37'. Furthermore, the cam ball 33' and the coil spring 35' are the same with the cam ball 33 and the rotary spring 35 in the rotation control body 30, so unnecessary details will not be given here any more.

The nut ring body 31' is composed of the nut main body 61, a cylindrical outer cover 62 and an operating ring 63.

The nut main body 61 comprises a cylindrical main body 611 which is of a slightly cylinder shape and is provided with a circular opening 613 therein, and a flange disc part 612 which is arranged on the back external circumferential surface of the cylindrical main body 611 and protrudes to outside the diameter.

Furthermore, a screw groove 614 which protrudes to the circular opening 613 is arranged on the internal circumferential surface of the cylindrical main body 611. The screw grove 614 corresponds to the screw groove 324 arranged on the nut gear 32 of the rotation control body 30, and is a gear screw-joined with the screw groove 12a of the clamping jaws 12.

The cylindrical outer cover 62 is an outer cover for allowing to clamp and fix the cylindrical main body 611, and is provided with clearance fit notch parts 622 in the front the axle center L direction for cutting toward the back of the axle center L direction. Three clearances fit notch parts 622 are arranged in the circumferential directions, and are formed by the width cutting in the circumferential direction when the connecting rod 632 of the operating ring 63 is in clearance fit in the circumferential direction.

The operating ring 63 is composed of a ring main body 631 which has specified thickness and is of a circular shape observed from the front direction, and connecting rods 632 which extend the external circumferential surface of the ring main body 631 outside the diameter. Furthermore, the connecting rods 632 are arranged at three positions in the circumferential direction corresponding to the clearance fit notch parts 622. As mentioned above, the connecting rods 632 extended outside the diameter from the ring main body 631 are connected inside the external sleeve (not shown), and rotates through the rotation operation of the external sleeve.

Furthermore, a guide groove 634 which has the same structure with the guide groove 314 of the nut ring 31 arranged on the rotation control body 30 is arranged on the front sidefaces of the ring main body 631 and the connecting rods 631 in the axle center L direction.

On the ring main body 322' which has specified thickness and is of a circular shape observed from the front face, the nut gear 32' comprises an internal circumferential surface mesh gear 325', a ratchet 326' and a guiding limitation hole 328'.

To be detailed, the nut gear 32' has the diameter same with the cylindrical outer cover 62, and is provided with an insetting convex part 329' on the back sideface of the ring main body 322' in the axle center L direction, wherein the insetting convex part 329' is inset with the clearance fit notch part 622 of the cylindrical outer cover 62. Therefore the nut gear 32' and the cylindrical outer cover 62 in which the clearance fit notch part 622 is inset with the insetting convex part 329' are integrated in the rotation direction, and rotate together.

Furthermore, the internal circumferential surface mesh gear 325', which corresponds to the internal circumferential surface mesh gear 325 arranged on the nut gear 32 of the rotation control 30 and has the same structure with the internal circumferential surface mesh gear 325, is arranged on the internal circumferential surface of the ring main body 322', and protrudes to the circular opening 323 in the center of the ring main body 322' which is of a circular shape observed from the front direction.

The ratchet 326' which has slightly actinomorphic gear teeth direction is arranged in the front of the ring main body 322'. The guiding limitation hole 328' which allows the clearance fit of the cam ball 33 clamped into the guide groove 634 is arranged on the ring main body 322' at the position opposite to the guide groove 634.

The locking gear 34' has the same structure with the locking gear 34 of the rotation control body 30, so unnecessary details will not be given here any more, wherein the locking gear 34' comprises a cylindrical main body 341' with the circular opening 343' and a flange disc part 342' of the cylindrical main body, and is provided with an internal circumferential surface gear 344', an insetting convex part 345', a ratchet 346', the back face ring protrusion part 347' and an external circumferential surface gear 348'.

The limit ring 37' is a flat plate ring-shaped limit part which is provided with a notch part 371' formed by cutting a part of the circumference. The notch part 371' can be opened to clamp the limit ring clamping groove 117' arranged on the clamping head disc body 11'.

The rotation control body 30' formed by the composing elements with the above-mentioned structures is installed on the clamping head main body 10' through the accessory 20' (with reference to FIG. 16).

At this time, the screw groove 614 of the nut main body 61 is screw-joined with the screw groove 12 of the clamping jaw 12.

Furthermore, the internal circumferential surface gear 344' of the locking gear 34' is meshed with the circumferential surface gear 116' of the clamping head disc body 11', with the result that the rotation is restricted by the locking gear 34' which is in a state of allowing to slide to the axle center L direction relatively to the clamping head disc body 11'.

Furthermore, the nut gear 32' with the insetting convex part 329' inset in the clearance fit notch part 622 and the nut main body 61 clamped in the cylindrical outer cover 62 are integrated in the rotation direction.

Furthermore, with the rotary spring 35 as the reaction force wherein the rotary spring 35 is arranged in the front of the axle center L direction of the rotation control body 30' and is clamped in the limit ring clamping groove 117', the rotary spring 35 biases the locking gear 34' toward the nut gear 32'.

As a matter of course, the gear mesh height X1 and the separation distance Y1 of the ratchets 326' and 346' in the rotation control body 30', the gear mesh width X2 and the separation distance Y2 of the circumferential surface mesh gears 325' and 348', and the depths t (namely the press amount p) in the guide groove 634 have the same relationship with the above rotation control body 30.

Furthermore, the connecting rods 632 of the operating ring 63 perform clearance fit in the clearance fit notch part 622 of the cylindrical outer cover 62. Therefore, through rotating the external sleeve (not shown), the connecting rods 632 can do differential rotation relatively to the nut gear 32'.

Therefore, the rotation control body 30' of the clamping head device 1' guides the cam ball 33 which is in clearance fit with the guiding limitation hole 328' of the nut gear 32' to the clamping position in the guide groove 634, such that the unidirectional locking state, the locking state and the unlocking state in the rotation control body 30 can be realized. The rotation control body 30' can realize the same effect with the rotation control body 30.

Next, the fastening clamp 2 with the locking mechanism will be detailed on the basis of the FIG. 17-FIG. 20.

Figure 17:
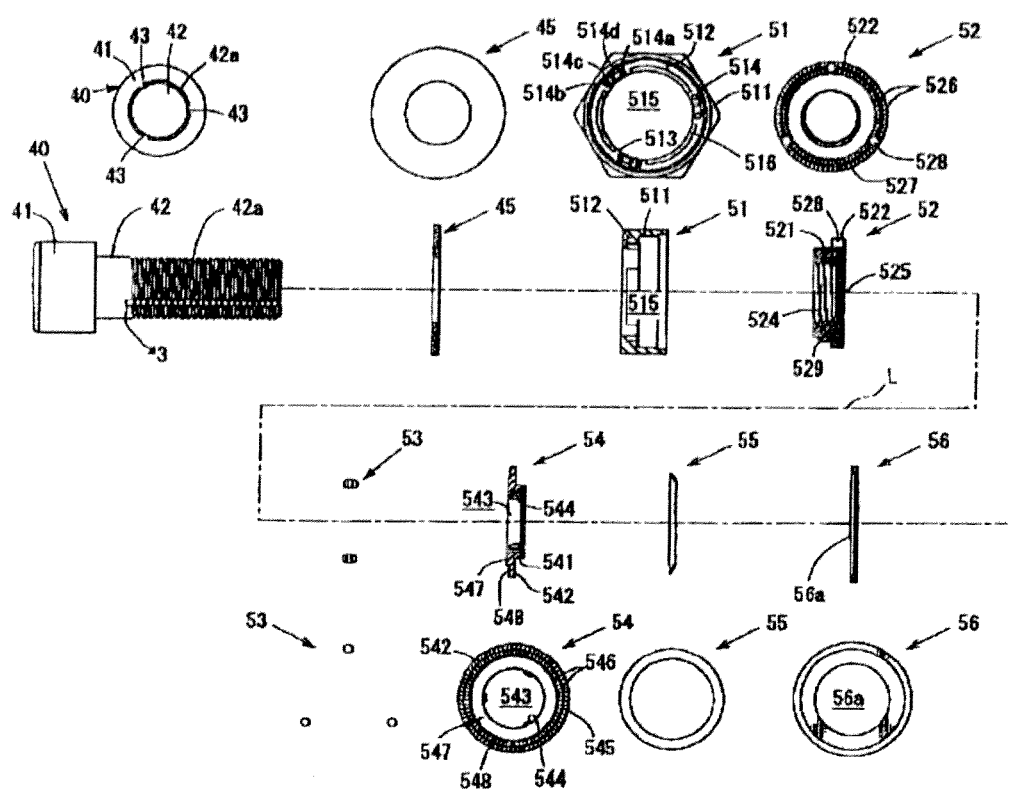
FIG. 17 is an exploded explanatory drawing illustrating the front face and side face of individual composing elements of the fastening clamp.

Furthermore, FIG. 17 is an exploded explanatory drawing simultaneously illustrating the front face (back face) and side face (cross section) of each composing element of the fastening clamp 2. To be detailed, FIG. 17 shows the back view of the nut locking gear 54 and the spring cap 56, and also shows the front view of the other composing elements. In addition, FIG. 17 shows the side view of the bolt 40 with the locking function, and the longitudinal sectional drawing of the other composing elements.

Figure 18:
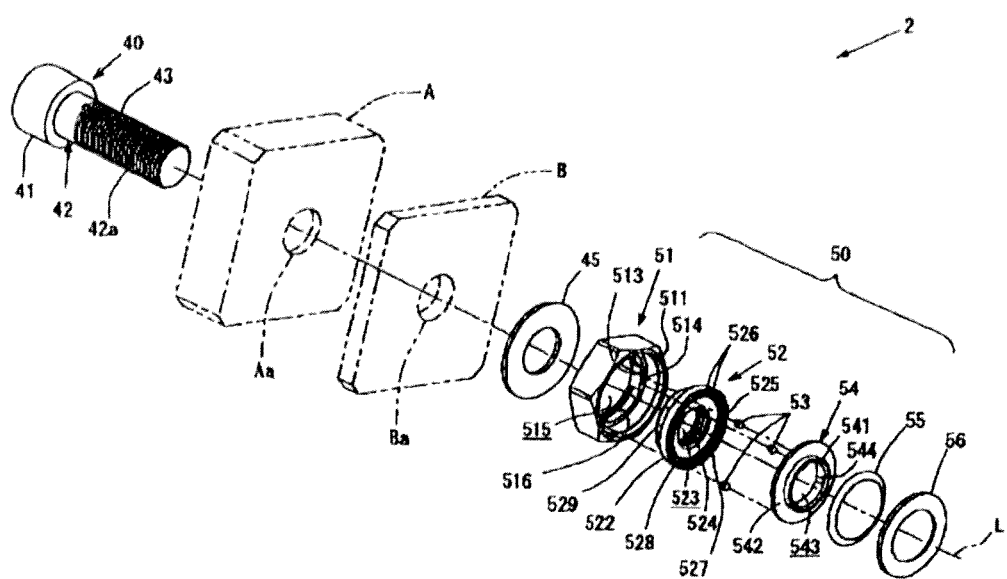
FIG. 18 is an exploded perspective diagram of individual composing elements of the fastening clamp.

Furthermore, the metal plates A and B shown by two dot lines in FIG. 18 are fastening parts fastened by the fastening clamp 2, and are not included in the composing elements of the fastening clamp 2.

Figure 19:
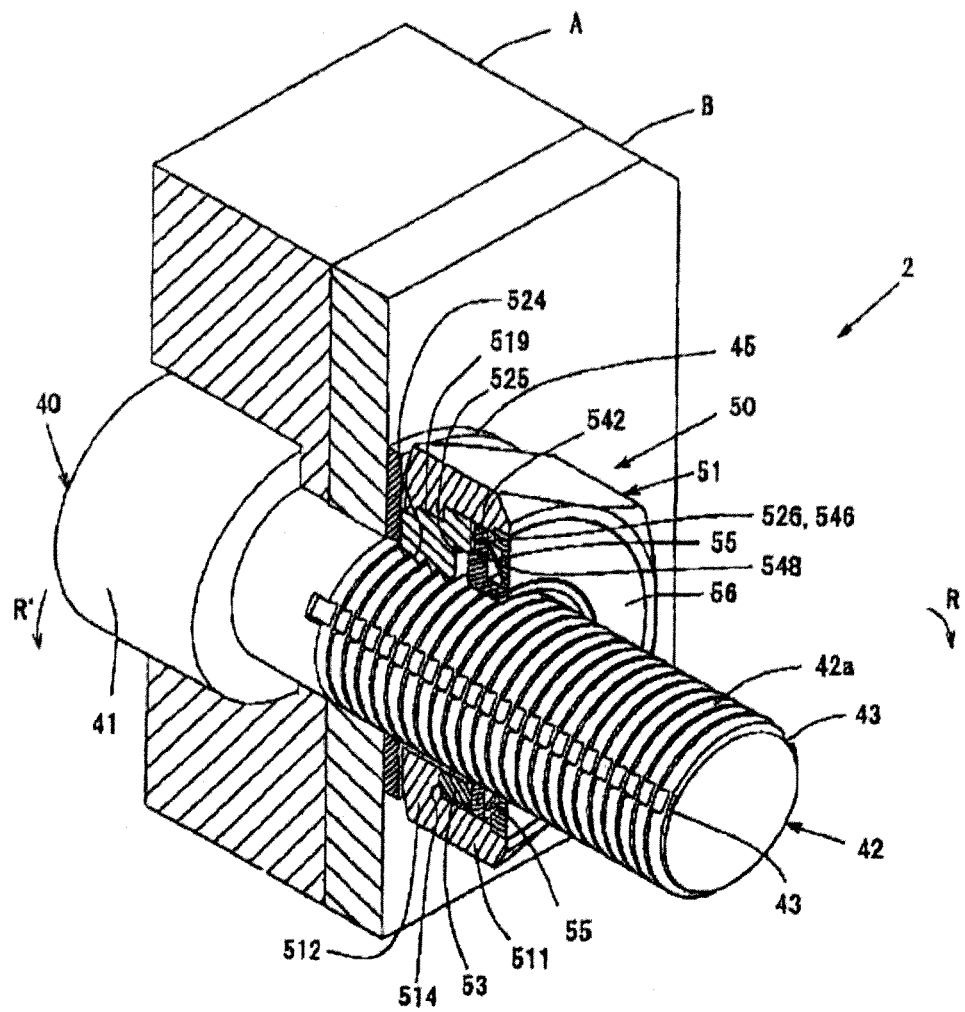
FIG. 19 is a local perspective diagram of the fastening clamp.

Furthermore, FIG. 19 shows a perspective diagram of the metal plates A and B and the nut 50 with the locking function which is cut off along the longitudinal profile direction in the state of the metal plates A and B being connected by the fastening clamp 2.

The fastening clamp is composed of the bolt 40 with the locking function, the flat pad 45 and the nut 50 with the locking function. However, the flat pad 45 is not a necessary part of the clamping head device 2, can be a substitute, and can be excluded during realizing the following functions.

As shown in FIG. 17, the bolt 40 with the locking function comprises a bolt head 41 and a bolt shaft 42.

The bolt head 41 is of a circular shape observed from the rear direction. Although the figure thereof is omitted, a hexagonal nut, which is used for be inserted as the fastening clamp and looked like a hexagonal inserting hole of a hexagonal shape observed from the rear direction, is arranged on the back face of the bolt head 41.

The bolt shaft 42 is of a cylinder shape which is comparatively long in the axle center L direction, and is provided with a screw groove 42a on the external circumferential surface.

Furthermore, as shown in the front view of FIG. 17, the bolt shaft 42 is provided with clamping grooves 43 at three positions on the circumference, with the clamping grooves 43 are formed by cutting the screw groove 42a along the direction parallel with the axle center L direction.

The flat pad 45 is used to guarantee the rotation of the nut 50 with the locking function relatively to the metal plate B during fastening, and is of a flat plate ring shape which the bolt shaft 42 can be inserted into.

The nut 50 with the locking function comprises a hexagonal nut ring 51, a nut gear 52, a cam pin 53, a nut locking gear 54, a disc spring 55 and a spring cap 56.

The hexagonal nut ring 51, with the same structure with the above nut ring 31, comprises a hexagonal cylinder main body 511 which is of a slightly hexagonal cylinder shape and is provided with a circular opening 515 therein, and a flange part 512 which is arranged on the back internal surface of the hexagonal cylinder main body 511 and protrudes to the center, namely the direction of the axle center L (with reference to FIG. 17 and FIG. 18).

Furthermore, three protrusion parts 513 which protrude to the center are arranged at the three positions in the circumferential direction of the flange part 512. In addition, a guide groove 514 which is used for clamping the cam pin 53 is arranged in the front of the flange part 512 (as shown at the right side of FIG. 4). Furthermore, a clearance fit concave part 516 which is clearance fit with the clearance fit convex part 529 of the nut gear 52 in the circumferential direction is arranged between the protrusion parts 513.

Furthermore, the guide groove 514 has the same structure with the above guide groove 314. To be detailed, the unlocking position concave part 514a and the unlocking position concave part 314a, the unidirectional locking position concave part 514b and the unidirectional locking position concave part 314b, the locking position concave part 514c and the locking position concave part 314c, and the connecting groove part 514d and the connecting groove part 314d have the same structures respectively.

The nut gear 52 has the same structure with the above nut gear 32. To be detailed, the nut main body 521 and the nut main body 321, the flange disc part 522 and the flange disc part 322, and the circular opening 523 and the circular opening 323 have the same structures respectively.

In addition, the screw groove 524 arranged on the internal circumferential surface of the nut main body 521 which is used for forming the circular opening 523 is different from the above screw groove 324. And, the screw groove 524 is screw-joined with the screw groove 42a of the bolt shaft 42 and therefore is arranged in parallel with the axle center L direction.

Furthermore, the internal circumferential surface mesh gear 525 and the internal circumferential surface mesh gear 325, the ratchet 526 and the ratchet 326, the insetting groove 527 and the insetting groove 327, the guiding limitation hole 528 and the guiding limitation hole 328, and the clearance fit convex part 529 and the clearance fit convex part 329 have the same structures respectively.

The cam pin 53 clamped into the guide groove 514 is a pin body which is provided with two hemispherical ends. The cam pin 53 is in clearance fit within each guiding limitation hole 528, so that the two hemispherical ends are arranged in the axle center L direction.

The nut locking gear 54 has the same structure with the above locking gear 34. To be detailed, the cylindrical main body 541 and the cylindrical main body 341, the flange disc part 542 and the flange disc part 342, the circular opening 543 and the circular opening 343, the insetting convex part 545 and the insetting convex part 345, the ratchet 546 and the ratchet 346, the back face ring protrusion part 547 and the back face ring protrusion part 347, and the external circumferential surface mesh gear 548 and the external circumferential surface mesh gear 348 have the same structures respectively.

Furthermore, an internal circumferential surface convex part 544 is of a mini home base shape which protrudes to the circular opening 543 and the back of the axle center L direction. Besides, the mini home base can be clamped into the clamping groove 43 arranged on the bolt shaft 42 in the axle center L direction.

The disc spring 55 has a mini-trapezoidal lateral surface which becomes thinner toward the front tip in the axle center L direction, and biases the spring of the nut locking gear 54 toward the nut gear 52 with the spring cap 56 as the reaction force.

The spring cap 56 is a ring body formed with specified thickness and is provided therein with an insetting space 56a for insetting the disc spring 55.

Figure 20:
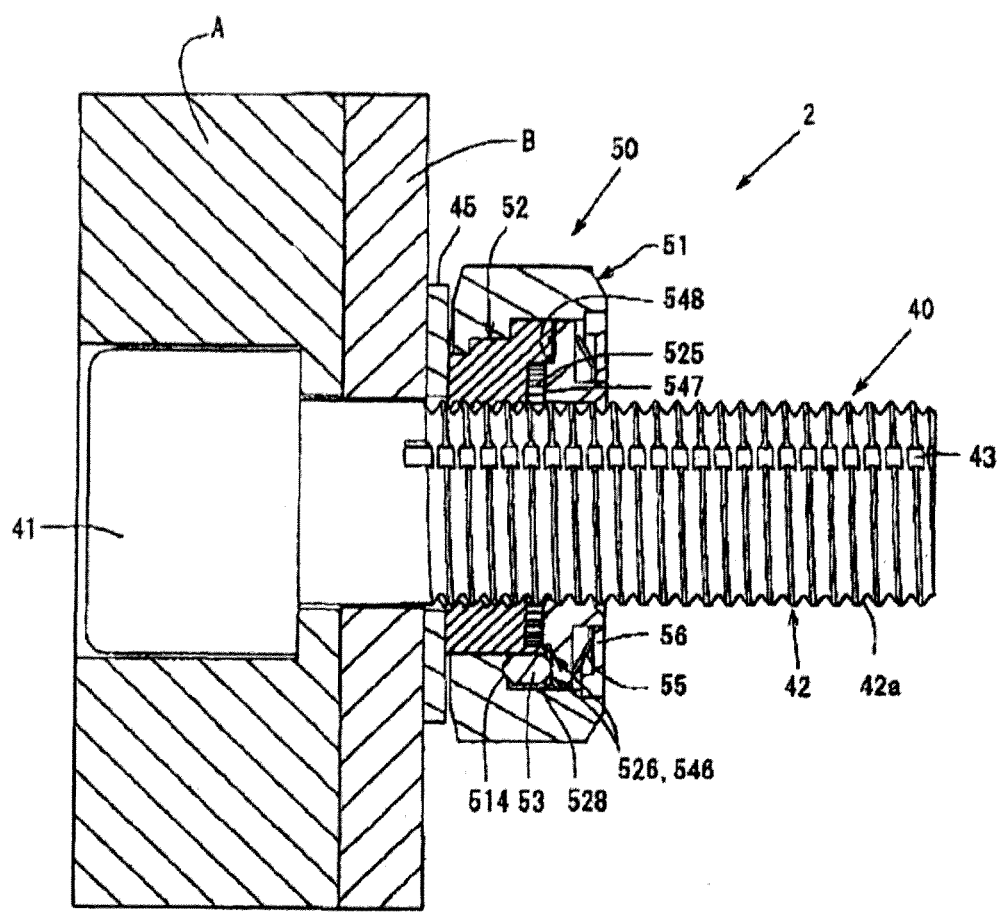
FIG. 20 is a longitudinal sectional drawing of the fastening clamp.

As mentioned above, the hexagonal nut ring 51, the nut gear 52, the cam pin 53, the nut locking gear 54, the disc spring 55, and the spring cap 56 are assembled to form the nut 50 with the locking unction (with reference to FIG. 19 and FIG. 20).

To be detailed, the ratchet 526 of the flange disc part 522 and the ratchet 546 of the flange disc part 542 are arranged oppositely in the axle center L direction; and the nut locking gear 54 and the nut gear 52 in which the cam pin 53 is inserted into the guiding limitation hole 528 are inserted in the circular opening 515 of the hexagonal nut ring 51.

In this case, the clearance fit convex part 529 of the nut gear 52 is clearance fit with the clearance fit concave parts 516 arranged between the protrusion parts 513 of the hexagonal nut ring 51. In addition, the external circumferential surface mesh gear 548 of the back face ring protrusion part 547 and the internal circumferential surface mesh gear 525 of the nut gear 52 are arranged oppositely and are meshed with each other in the radial direction.

Furthermore, in the state that the clearance fit convex part 529 is in clearance fit with the clearance fit concave parts 516, the guide groove 514 arranged on the protrusion part 513 is opposite to the guiding limitation hole 528 in the axle center L direction. In addition, the cam pin 53 inserted in the guiding limitation hole 528 is clamped from the front and the back in the axle center L direction by the guide groove 514 and the insetting convex part 545 of the nut locking gear 54.

Furthermore, from the front side of the nut locking gear 54, the disc spring 55 and the spring cap 56 are pressed into the hexagonal cylinder main body 511.

Thereby, the rotation of the spring cap 56 in the axle center L direction at the circular opening 515 is restricted, with the result that with the spring cap 37 as the reaction force, the disc spring 55 biases the nut locking gear 54 toward the nut gear 52, namely the rear of the axle center L direction.

Through the biasing force of the disc spring 55, the ratchet 546 of the nut locking gear 54 and the ratchet 526 of the nut gear 52 are meshed with each other; and the internal circumferential surface mesh gear 525 and the external circumferential surface mesh gear 548 are arranged oppositely in the radial direction and are meshed with each other.

In the nut 50 with the locking function assembled as above mentioned, the ratchet 546 of the nut locking gear 54 is meshed with the ratchet 526 of the nut gear 52; the external circumferential surface mesh gear 548 is meshed with the internal circumferential surface mesh gear 525. The relations between the above mentioned meshes and the press amount of the cam pin 53 clamped into the guide groove 514 are the same with the relations in the rotation control body 30, so unnecessary details will not be given here any more.

The bolt 40 with the locking function and the nut 50 the locking function are used to fasten the metal plates A and B, so that the fastening state can be locked.

The detailed explanation will be given hereafter. When the bolt 40 with the locking function and the nut 50 with the locking unction are used to fasten the metal plates A and B, first, the bolt shaft 42 of the bolt 40 with the locking function is made to penetrate through the bolt holes Aa and Bb of the metal plates A and B, and then the nut 50 with the locking function is screwed on the bolt shaft 42 protruding from the opposite side.

At this time, the internal circumferential surface convex part 544 of the nut 50 with the locking function is clamped in the clamping groove 43 of the bolt shaft 42. Furthermore, the screw groove 524 of the nut 50 with the locking function 50 is screw-joined with the screw groove 42a of the bolt 40 with the locking function, such that because the internal circumferential surface convex part 544 is clamped in the clamping groove 43, the nut locking gear 54 of the nut 50 with the locking function, in the state that the bolt 40 with the locking function is slidable in the axle center L direction relatively, has the restricted rotations in the rotation directions R and R'.

Furthermore, the nut 50 with the locking function rotates to the fastening rotation direction R, and is screwed on the bolt 40 with the locking function, such that the metal plates A and B clamped by the bolt head 41 and the nut 50 with the locking function can be fastened.

In the fastening state, the hexagonal nut ring 51 rotates to the fastening rotation direction R further, wherein because the rotation of the nut gear 52 which has been in the fastening state has been fixed, the hexagonal nut ring 51 performs differential rotation relatively to the nut gear 52 to the front of the fastening rotation direction R.

In virtue of the differential rotation relative to the nut gear 52 to the front of the fastening rotation direction R, as shown in FIG. 12, the cam pin 53 which is in clearance fit within the guiding limitation hole 528 of the nut gear 52 whose rotation is fixed is clamped in the unidirectional locking position concave part 514b of the guide groove 514.

The ratchets 526 and 546 in the axle center L direction are meshed with each other, and the internal circumferential surface mesh gear 525 and the external circumferential surface mesh gear 546 in the radial direction are separated with each other. Therefore, as shown in FIG. 12 (c), the cam pin 53 clamped into the unidirectional position concave part 514b comes in the unidirectional locking state in which the nut gear 52 and the nut locking gear 54 can only rotate in the fastening rotation direction R.

In this case, as shown in FIG. 12 (b), the front sideface in the fastening rotation direction R of the protrusion part 513 is connected with the back sideface in the fastening rotation direction R of the clearance fit convex part 529. Therefore, the hexagonal nut ring 51 can be further screwed into the bolt shaft 42 through rotating the hexagonal nut ring 51 to the fastening rotation direction R. However, because the ratchets 526 and 546 in the axle center L direction are meshed with each other, the rotation in the unfastening rotation direction R' is restricted and the fastening state is locked.

Furthermore, in the unidirectional locking state, as shown in FIG. 12 (c), the ratchets 526 and 546 are meshed with each other at the middle position of the gear teeth height. Therefore, in the unidirectional locking state, if the rotation operation toward the fastening rotation direction R is stopped, then because the disc spring 55 biases the nut locking gear 54 to the nut gear 52, through the biasing force of the disc spring the disc spring 55 the unidirectional locking state is automatically switched to the locking state in which the ratchets 526 and 546 abut against each other.

To be detailed, by the biasing force of the disc spring 55, the nut ring 51 performs differential rotation to the unfastening rotation direction R' relatively to the nut gear 52, so that the ratchets 526 and 546 abut against each other and the cam pin 53 clamped in the unidirectional locking position concave part 514b moves to the locking position concave part 514c.

In this way, the cam pin 53 is clamped into the locking position concave part 514c, and the ratchets 526 and 546 abut against each other, such that the circumferential surface mesh gears 525 and 548 in the radial direction are also meshed with each other and come into the locking state as shown in FIG. 14(c). In this case, not only the ratchets 526 and 546 in the axle center L direction are meshed with each other, but also the circumferential surface mesh gears 525 and 548 in the radial direction are also meshed with each other, therefore the rotations in both the fastening rotation direction R and the unfastening rotation direction R' are restricted, and the fastening state of the fastening clamp 2 is locked.

When unlocking and dismounting the fastening clamp 2 in the fastening state, the hexagonal nut ring 51 is made to rotate to the unfastening rotation direction R'. At this time, the nut 50 with the locking function is being in the locking state, so the hexagonal nut ring 51 performs differential rotation to the unfastening rotation direction R' relatively to the nut gear 52.

Through the differential rotation performed by the hexagonal nut ring 51 relatively to the nut gear 52, the cam pin 53 clamped in the locking position concave part 514c moves to the unlocking position concave part 514a through the guiding limitation hole 528 of the hexagonal nut ring 51 performing the differential rotation, as shown in FIG. 10.

The cam pin 53 which is clamped into the unlocking position concave part 514a and has the press amount pa, presses and moves the nut locking gear 54 toward the front of the axle center L direction against the biasing force of the disc spring 55. Due to the pressing of the cam pin 53, as shown in FIG. 10

(c), the ratchets 526 and 546 in the axle center L direction and the circumferential surface mesh gears 525 and 548 in the radial direction are separated.

Therefore, the locking state of the nut 50 with the locking function is unlocked, and the nut gear 52 and the nut locking gear 54 come into the unlocking state of allowing relative rotation.

Through unlocking the locking state of the nut 50 with the locking function, the hexagonal nut ring 51 is made to rotate to the unfastening rotation direction R'. As shown in FIG. 10 (b), in virtue of the differential rotation to the unfastening rotation direction R', the front sideface in the unfastening rotation direction R' of the protrusion part 513 is connected with the back sideface in the fastening rotation direction R' of the clearance fit convex part 529. Therefore, the nut gear 52 in which the screw groove 524 is screw-joined with the screw groove 42a rotates to the unfastening rotation direction R', so that the nut 50 with the locking function can be screwed down.

Additionally, in the unlocking state, the cam pin 53 clamped into the unlocking position concave part 514a presses the insetting convex part 545 of the nut locking gear 54 toward the front of the axle center L direction, and the cam pin 53 with the spherical ends slides on the surface of the insetting convex part 545 which is of a circular shape observed from the back face.

Thereby, for the nut gear 52 which performs the rotation relative to the nut locking gear 54, the cam pin 53 in the above-mentioned state plays the role of the bearing, so that the rotary load caused by the relative rotation can be reduced and the rotation toward the unfastening rotation direction R' can be performed easily, wherein the nut locking gear 54 can not rotate on the clamping head disc body 11.

The rotation control body 30 and the nut 50 with the locking function in the above-mentioned structures can achieve the effects recorded as follows.

In addition, in the explanation of the effects of the present invention, the rotation control body 30' has the same components with the rotation control body 30, so the reference numbers in the rotation control body 30' are omitted.

The rotation control body 30 and the nut 50 with the locking function are the locking mechanism as follows: in the screw-joint structures (1, 2) which comprises the male screw bodies (12, 14) with the male screw parts (12a, 42a) on the external circumferential surface and the female screw bodies with the female screw parts (324, 524) which is on the internal circumferential surface and screwed with the male screw parts (12a, 42a), the locking mechanism is used for locking the fastening fixing state (fastening state) of the male screw bodies (12, 14) and the female screw bodies screw-jointed.

Furthermore, the rotation control body 30 and the nut 50 with the locking function comprise the male screw side gear parts (34, 54) which have been fixed in the screw-joint rotation directions relatively to the male screw bodies (12, 14), and the female screw side gear parts (32, 52) which have been fixed in the screw in and screw-out directions of the female screw bodies, i.e. the axial direction (L) and the screw-joint rotation input directions (R, R'), wherein the male screw side gear parts (34, 54) and the female screw side gear parts (32, 52) are respectively provided with the mesh gears (325, 348, 525, 548) meshed in the screw-joint rotation direction, and the ratchets (326, 346, 526, 546) meshed only in the screw-out rotation direction of the screw-joint rotation direction. At the same time, one of the mesh gears (325, 348, 525, 548) and the ratchets (326, 346, 526, 546) is meshed in the axial direction (L), and the other is meshed in the radial direction. In virtue of the locking switching units (33, 314, 53, 514) which is used for switching between the fastening locking state in which the mesh gears (325, 348, 525, 548) and the ratchets (326, 346, 526, 546) are meshed and the unlocking state in which the meshes of the mesh gears (325, 348, 525, 548) and the ratchets (326, 346, 526, 546) are unlocked, the locked fastening fixing state (fastening state) will not be unlocked inadvertently, and the fastening fixing state (fastening state) can be locked reliably.

To be detailed, in the locking state which is switched by the locking switching units (33, 314, 53, 514), in the axial direction (L) and the radial direction, the mesh gears (325, 348, 525, 548) and the ratchets (326, 346, 526, 546) are meshed. Therefore, compared with the locking mechanism in which the ratchets only in the axial direction (L) are meshed, the locking mechanism of the present invention can lock the fastening state reliably.

Furthermore, the female screw body is composed of the female screw side gear parts (32, 52) with the female screw parts (324, 524) on the internal circumferential surface, and the female screw operating parts (31, 51) which perform the operation of screwing in/screwing out the female screw side gear parts (32, 52) and can do differential motion relative to the female screw side gear parts (32, 52). And, the female screw body comprises the relative change units (33, 314, 53, 514) which do the differential motion relative to the female screw side gear parts (32, 52) through the female screw operating parts (31, 51) such that one party of the male screw side gear parts (34, 54) and the female screw side gear parts (32, 52) generates relative change relatively to the other party. Therefore, in virtue of the differential rotation of the female screw operating parts (31, 51) relative to the female screw side gear parts (32, 52), the relative change units (33, 314, 53, 514) makes the male screw side gear parts (34, 54) and the female screw side gear parts (32, 52) to change relatively, so as to switch the mesh states of the mesh gears (325, 348, 525, 548) and the ratchets (326, 346, 526, 546). Thereby, the locking state is switched through the relative deformation, and the fastening fixing state (fastening state) can be locked reliably.

In addition while the male screw side gear parts (34, 54) and the female screw side gear parts (32, 52) are arranged in the same axis with the axial direction (L), the male screw side gear parts (34, 54) and the female screw side gear parts (32, 52) are respectively provided with the axial direction opposite surfaces (322, 342, 522, 542) which are opposite in the axial direction (L), and the radial direction opposite surfaces (the internal circumferential surface of 321, the internal circumferential surfaces of 347 and 521, and 547) which are opposite in the radial direction. The ratchets (326, 346, 526, 546) in which the gear teeth direction is slightly actinomorphic are arranged on the axial direction opposite surfaces (322, 342, 522, 542), and the mesh gears (325, 348, 525, 548) in which the gear teeth direction is the axial direction (L) are arranged on the radial direction opposite surfaces (the internal circumferential surface of 321, the internal circumferential surfaces of 347 and 521, and 547). In virtue of the relative movement of the male screw side gear parts (34, 54) and the female screw side gear parts (32, 52), the relative change units (33, 314, 53, 514) make the ratchets (326, 346, 526, 546) arranged on the axial direction opposite surfaces (322, 342, 522, 542) are meshed with the mesh gears (325, 348, 525, 548) arranged on the radial direction opposite surfaces (the internal circumferential surface of 321, the internal circumferential surfaces of 347 and 521, and 547), such that one party of the male screw side gear parts (34, 54) and the female screw side gear parts (32, 52) moves relatively to the other party in the axial direction (L) between the mesh position in which the ratchets (326,

346, 526, 546) are in contact with each other and the separation position in which the ratchets (326, 346, 526, 546) are separated, therefore the fastening fixing state (fastening state) can be locked.

Furthermore, the locking mechanism also comprises separation state bearings (33, 53) which are used for assisting the rotation of the female screw body arranged at the separation position, such that even when unlocking the locked fastening fixing state (fastening state), under the bearing effect of the separation state bearings (33, 53), the locked fastening fixing state (fastening state) can be unlocked smoothly.

In addition, the locking mechanism comprises the biasing units (35, 55) at the side of the female screw side gear parts (32, 52) with the axial direction opposite surfaces (322, 342, 522, 542) opposite with each other, which are used for biasing the male screw side gear parts (34, 54). Furthermore, the axial direction relative move units (33, 314, 53, 514) is composed of the press units (33, 53) and the guide grooves (314, 514, 634), wherein the press units (33, 53) press the male screw side gear parts (34, 54) toward the direction of being separating from the axial direction opposite surfaces (322, 342, 522, 542) against the biasing force of the biasing units (35, 55); and the guide grooves (314, 514, 634) are arranged on the female screw operating parts (31, 51) and perform the guiding operation after being pressed to the press position corresponding to the specified press amount p in virtue of the differential rotation of the female screw operating parts (31, 51) relative to the female screw side gear parts (32, 52). Therefore, through the biasing force of the biasing units (35, 55), the mesh state of the ratchets (326, 346, 526, 546) arranged on the axial direction opposite surfaces (322, 342, 522, 542) can be maintained.

Furthermore, the press units (33, 53), which obtains the specified press amount p by being guided by the guide groves (314, 514, 634), causes the axial direction opposite surfaces (322, 342, 522, 542) are separated with each other, against the biasing force of the biasing units (35, 55), so that the mesh state can be unlocked reliably.

At the same time, the guide grooves (314, 514, 634) guide the press units (33, 53) to the unlocking positions (314a, 514a) formed with the first press amount pa in which the meshes of the mesh gears (325, 348, 525, 548) and the ratchets (326, 346, 526, 546) are unlocked, the fastening locking positions (314c, 514c) formed with the second press amount pc in which the mesh gears (325, 348, 525, 548) and the ratchets (326, 346, 526, 546) are meshed, and the unidirectional fastening locking positions (314b, 514b) formed with the third press amount pb in which only the ratchets (326, 346, 526, 546) in mesh gears (325, 348, 525, 548) and the ratchets (326, 346, 526, 546) are meshed, wherein the press amounts are set by the gradual increasing sequence of the first press amount pa, the third press amount pb and the second press amount pc. Furthermore, the ratchets (326, 346, 526, 546) are configured as follows: in the locking state in which the mesh gears (325, 348, 525, 548) and the ratchets (326, 346, 526, 546) are meshed, the gear mesh height X1 in the axial direction (L) is lower than the difference between the first press amount pa and the second press amount pc; and in the unlocking state in which the meshes of the mesh gears (325, 348, 525, 548) and the ratchets (326, 346, 526, 546) are unlocked, the separation distance Y1 in the axial direction (L) is shorter than the difference between the first press amount pa and the third press amount pb. In addition, the mesh gears (325, 348, 525, 548) are configured as follows: in the locking state in which the mesh gears (325, 348, 525, 548) and the ratchets (326, 346, 526, 546) are meshed, the gear mesh width X2 in the axial direction (L) is lower than the difference between the third press amount pb and the second press amount pc; and in the unlocking state in which the meshes of the mesh gears (325, 348, 525, 548) and the ratchets (326, 346, 526, 546) are unlocked, the separation distance Y2 in the axial direction (L) is shorter than the difference between the first press amount pa and the second press amount pc. Therefore, the switching can be performed between the fastening locking state in which the mesh gears (325, 348, 525, 548) and the ratchets (326, 346, 526, 546) are meshed, the unidirectional fastening locking state in which the rotation in only one direction is locked while the rotation in the other direction is possible by making only the ratchets (326, 346, 526, 546) meshed, and the unlocking state in which the meshes of the mesh gears (325, 348, 525, 548) and the ratchets (326, 346, 526, 546) are unlocked.

To be detailed, the guide grooves (314, 514, 634) guide the press units (33, 53) to the unlocking positions (314a, 514a) of the first press amount pa, the unidirectional fastening locking positions (314b, 514b) of the third press amount pb, and the fastening locking positions (314c, 514c) of the second press amount pc, so that the unlocking state, the unidirectional fastening locking state and the fastening locking state can be switched.

At the same time, in virtue of the mesh state of the ratchets (326, 346, 526, 546) and the biasing force of the biasing units (35, 55), it is guided automatically from the unidirectional fastening locking positions (314b, 514b) to the fastening locking positions (314c, 514c), so that it can be switched from the unidirectional fastening locking state to the fastening locking state.

In the corresponding relations between the structures of the present invention (the present embodiment) and the above mentioned embodiments, the male screw parts are corresponding to the screw groove 12a and 42a.

Similarly, the male screw body, the clamping head main body or the bolt is corresponding to the clamping jaws 12 and the bolt shaft 42.

The female screw part is corresponding to the screw grooves 324, 324' and 524.

The female screw body, the female screw side gear parts or the nut ring is corresponding to the nut gears 32, 32' and 52, and the nut 50 with the locking function.

The screw-joint structure, the clamping head device or the fastening clamp is corresponding to the clamping head devices 1, 1', and the fastening clamp 2.

The locking mechanism is corresponding to the rotation control bodies 30 and 30', and the nut 50 with the locking function.

The male screw side gear part or the locking flange is corresponding to the locking gears 34 and 34', and the nut locking gear 54.

The mesh gear is corresponding to the internal circumferential surface mesh gears 325, 325' and 525, and the external circumferential surface mesh gears 348, 348' and 548.

The axial direction is corresponding to the axle center L direction.

The locking switch unit, the relative change unit, the limitation releasing unit or the axial direction relative move unit is corresponding to the cam ball 33, the cam pin 53 or the guide grooves 314, 514 and 634.

The female screw operating part is corresponding to the nut ring 31, the nut ring body 31' or the hexagonal nut ring 51;

The axial direction opposite surface is corresponding to the flange disc parts 322, 342, 342', 522, and 542, or the ring main body 322'.

The radial direction opposite surface is corresponding to the internal circumferential surfaces of the nut main body 312 and 521, and the back face ring protrusion parts 347, 347' and 547.

The separation state bearing or the press unit is corresponding to the cam ball 33 or the cam pin 53.

The biasing unit is corresponding to the coil spring 35 or the disc spring 55.

The unlocking position is corresponding to the unlocking position concave parts 314a and 514a.

The fastening fixing position is corresponding to the locking position concave parts 314c and 514c.

The unidirectional fastening fixing position is corresponding to the unidirectional fastening locking position concave parts 314b and 514b.

The clamping head jaw is corresponding to the clamping jaw 12.

The nut is corresponding to the nut 50 with the locking function.

The present invention is not restricted to the above-mentioned embodiments, and many other embodiments can be adopted.

For example, in the above description, the guide groove 314 (514, 634), against the biasing force of the coil spring 35 (55), causes the ratchets 326, 346 (326', 346', 526, 546) meshed in the axle center L direction, and the circumferential surface mesh gears 325, 348 (525, 548) to slide in the axle center L direction, to switch the mesh state and the separation state. However, the switching between the mesh state and the separation state of the gears can be realized through the changes in the radial direction, so that the ratchets are meshed in the radial direction and the mesh gears are meshed in the axle center L direction.

Furthermore, in the above description, measuring from the surface, the depths of the unlocking position concave part 314a, the unidirectional locking position concave part 314b and the locking position concave part 314c in the guide groove 314 (514, 634) are respectively ta, tb and tc. However, the present invention can also provide the nut ring 31 in which the depth tb of the unidirectional locking position concave part 314b is the same with the depth tc of the locking position concave part 314c.

The nut ring 31 with this structure will not be switched into the unidirectional locking state during switching into the locking state, so ratchet wheel noises of the ratchets 326, 346 (526, 546) are not generated. Therefore, for those users who do not like the ratchet wheel noises, the locking mechanism with comparatively high satisfaction degree can be formed.

In addition, through adjusting the depth tb of the unidirectional locking position concave part 314b, the ratchet wheel noises generated by the ratchets 326, 346 (526, 546) in the unidirectional locking state can be adjusted.

Even under this circumstance, the above-mentioned effect can also be achieved by installing the nut ring 31 with a different depth tb of the unidirectional locking position concave part 314b in the other structures. Therefore, the present invention can reduces the cost compared with the circumstance that a plurality of rotation control bodies 30 are arranged in order to achieve abovementioned effect.

| Reference Number | Description |
| --- | --- |
| 11 | Clamping head device |
| 2 | Fastening clamp |
| 12 | Clamping jaw |
| 12a | Screw groove |

-continued

| Reference Number | Description |
| --- | --- |
| 30, 30' | Rotation control body |
| 31 | Nut ring |
| 31' | Nut ring body |
| 32, 32' | Nut gear |
| 33 | Cam ball |
| 34, 34' | Locking gear |
| 35 | Coil (rotary) spring |
| 42 | Bolt shaft |
| 42a | Screw groove |
| 50 | Nut with locking function |
| 51 | Hexagonal nut ring |
| 52 | Nut gear |
| 53 | Cam pin |
| 54 | Nut locking gear |
| 55 | Disc spring |
| 314, 514, 634 | Guide groove |
| 314a, 514a | Unlocking position concave part |
| 314b, 514b | Unidirectional locking position concave part |
| 314c, 514c | Locking position concave part |
| 321, 521 | Nut main body |
| 322, 342, 342', 522, 542 | Flange disc part |
| 322' | Ring main body |
| 324, 524, 614 | Screw groove |
| 325, 325', 525 | Internal circumferential surface mesh gear |
| 326, 346, 326', 346', 526, 546 | Ratchet |
| 347, 347', 547 | Back face ring protrusion part |
| 347, 348', 548 | External circumferential surface mesh gear |
| L | Axle center |
| X1 | Gear mesh height |
| X2 | Gear mesh width |
| Y1, Y2 | Separation distance |
| pa | The first press amount |
| pb | The second press amount |
| pc | The third press amount |

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all covered by the protection scope of the present invention.

The invention claimed is:

1. A locking mechanism, configured for locking a fastening fixing state of a male screw body and a female screw body screw-jointed, in a screw-joint structure which is composed of the male screw body with a male screw part on the external circumferential surface and a female screw body with a female screw part which is on the internal circumferential surface and screwed with the male screw part, characterized by comprising:
    a male screw side gear part, which has been fixed in a screw-joint rotation direction relative to the male screw body, and
    a female screw side gear part, which has been fixed in the screw-joint direction and a screw-joint rotation input direction relative to the female screw body, wherein
    the male screw side gear part and the female screw side gear part are respectively provided with mesh gears meshed in the screw-joint rotation direction, and ratchets meshed only in a screw-out rotation direction of the screw-joint rotation directions, and one party of the mesh gears and the ratchets is meshed in the axial direction, and the other party is meshed in the radial direction, wherein, the locking mechanism further comprises a locking switching unit which is used for switching between a fastening locking state in which the mesh gears and the ratchets are meshed and an unlocking state in which the mesh gears and the ratchets are unlocked, wherein the female screw body is composed of the female screw side gear part with the female screw part on the internal circumferential surface, and a female screw operating part which performs the operation of screwing in/screwing out the female screw side gear part and can do differential motion relative to the female screw side gear part, and the locking mechanism further comprises a relative change unit which causes one of the male screw side gear part and the female screw side gear part generates relative change relatively to the other one, in virtue of the differential motion of the female screw operating part relative to the female screw side gear part, wherein the locking switching unit is the relative change unit which changes the mesh state of the mesh gears and the ratchets through said relative change, wherein the male screw side gear part and the female screw side gear part are configured on the same axis of the axial direction, the male screw side gear part and the female screw side gear part are respectively provided with axial direction opposite surfaces which are opposite in the axial direction, and radial direction opposite surfaces which are opposite in the radial direction, the ratchets in which a gear teeth direction is slightly actinomorphic are arranged on the axial direction opposite surfaces, and the mesh gears in which the gear teeth direction is the axial direction is arranged on the radial direction opposite surface, and an axial direction relative move unit is the relative change unit, and causes that one party of the male screw side gear part and the female screw side gear part moves relatively in the axial direction between a mesh position in which the ratchets are in contact and a separation position in which the ratchets are separated, the locking mechanism further comprising: a biasing unit, which is configured to bias the female screw side gear part toward the female screw side gear part opposite to the axial direction opposite surface, wherein the axial direction relative move unit is composed of a press unit and a guide groove, wherein the press unit presses the male screw side gear part toward the direction of being separated from the axial direction opposite surface against a biasing force of the biasing unit; and the guide groove is formed on the female screw operating part, and through the differential rotation of the female screw operating part relative to the female screw side gear part, it is guided after being pressed to a press position corresponding to a specified press amount.

2. The locking mechanism according to claim 1, wherein the guide groove guides the press unit to an unlocking position formed with a first press amount in which the meshes of the mesh gear and the ratchet have been unlocked, the fastening locking position formed with a second press amount in which the mesh gear and the ratchet are meshed, and an unidirectional fastening locking position formed with a third press amount in which only the ratchet in the mesh gear and the ratchet is meshed, the press amounts are set by a gradual increasing sequence of the first press amount, the third press amount and the second press amount, a height of the ratchet is configured as follows: in the locking state in which the mesh gear and the ratchet are meshed, the gear mesh height in the axial direction is lower than the difference between the first press amount and the second press amount; and in the unlocking state in which the meshes of the mesh gear and the ratchet are unlocked, the separation distance in the axial direction is shorter than the difference between the first press amount and the third press amount, the gear length of the mesh gear in the axial direction is configured as follows: in the locking state in which the mesh gear and the ratchet are meshed, the gear mesh width in the axial direction is lower than the difference between the third press amount and the second press amount; and in the unlocking state in which the meshes of the mesh gear and the ratchet are unlocked, the separation distance in the axial direction is shorter than the difference between the first press amount and the second press amount.

3. A clamping head device installed on a driving device which is provided with a rotatable driving shaft, characterized by comprising the clamping head device, provided with the locking mechanism according to claim 2, and further comprising: a clamping head main body, which is of a slight cylinder shape, arranged on the axes center same with the driving shaft and provided in the front with a shaft hole for inserting the central shaft of a rotary clamp; a plurality of clamping head jaws, which are connected with the shaft hole, can move relatively to the clamping head main body, and are provided with male screw parts on the external circumferential surface; a nut ring, capable of being maintained on the clamping head main body rotatably, and provided on the internal circumferential surface with a female screw part which is screw-joined with the male screw part arranged on the external circumferential surface of a plurality of clamping head jaws, so as to move a plurality of clamping head jaws synchronously; and a locking flange disc, which can slide in the axle center direction relatively to the clamping head main body and whose rotation is fixed, wherein the nut ring and the locking flange disc are arranged adjacently in the axle center direction at the external circumferential portion of the clamping head main body, and further comprising: a rotation limited unit, which is configured for limiting the relative rotation of the nut ring and the locking flange disc toward the direction of unfastening the nut ring in the fastening fixing state, and a limitation unlocking unit, which is configured to unlock the limitation of the rotation limited unit applied to the relative rotation of the nut ring and the locking flange disc, wherein the clamping head main body forms the male screw body; the locking flange disc forms the male screw side gear part; the nut ring forms the female screw side gear part; the rotation limited unit forms the mesh gear and the ratchet; and the limitation unlocking unit forms the locking switching unit.

4. A fastening clamp for screw-joining a fastening bolt and a nut, characterized by comprising the locking mechanism according to claim 2, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

5. A clamping head device installed on a driving device which is provided with a rotatable driving shaft, characterized by comprising the clamping head device, provided with the locking mechanism according to claim 1, and further comprising: a clamping head main body, which is of a slight cylinder shape, arranged on the axes center same with the driving shaft and provided in the front with a shaft hole for inserting the central shaft of a rotary clamp; a plurality of clamping head jaws, which are connected with the shaft hole, can move relatively to the clamping head main body, and are provided with male screw parts on the external circumferential surface; a nut ring, capable of being maintained on the clamping head main body rotatably, and provided on the internal circumferential surface with a female screw part which is screw-joined with the male screw part arranged on the external circumferential surface of a plurality of clamping head jaws, so as to move a plurality of clamping head jaws synchronously; and a locking flange disc, which can slide in the axle center direction relatively to the clamping head main body and whose rotation is fixed, wherein the nut ring and the locking flange disc are arranged adjacently in the axle center direction at the external circumferential portion of the clamping head main body, and further comprising: a rotation limited unit, which is configured for limiting the relative rotation of the nut ring and the locking flange disc toward the direction of unfastening the nut ring in the fastening fixing state, and a limitation unlocking unit, which is configured to unlock the limitation of the rotation limited unit applied to the relative rotation of the nut ring and the locking flange disc, wherein the clamping head main body forms the male screw body; the locking flange disc forms the male screw side gear part; the nut ring forms the female screw side gear part; the rotation limited unit forms the mesh gear and the ratchet; and the limitation unlocking unit forms the locking switching unit.

6. A fastening clamp for screw-joining a fastening bolt and a nut, characterized by comprising the locking mechanism according to claim 1, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

7. A fastening clamp for screw-joining a fastening bolt and a nut, characterized by comprising the locking mechanism according to claim 1, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

8. A fastening clamp for screw-joining a fastening bolt and a nut, characterized by comprising the locking mechanism according to claim 1, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

9. A fastening clamp for screw-joining a fastening bolt and a nut, characterized by comprising the locking mechanism according to claim 1, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

10. A fastening clamp for screw-joining a fastening bolt and a nut, characterized by comprising the locking mechanism according to claim 1, wherein the male screw body with the male screw part on the external circumferential surface forms the bolt; and the nut is composed of the female screw body with the female screw part which is arranged on the internal circumferential surface and screwed with the male screw part, the male screw side gear part which has been fixed in the screw-joint rotation direction relatively to the male screw body, and the male screw side gear part which has been fixed in the axial direction and the screw-joint rotation input direction relatively to the female screw body.

11. the locking mechanism according to claim 1 further comprising: a biasing unit, which is configured to bias the female screw side gear part toward the female screw side gear part opposite to the axial direction opposite surface, wherein the axial direction relative move unit is composed of a press unit and a guide groove, wherein the press unit presses the male screw side gear part toward the direction of being separated from the axial direction opposite surface against the biasing force of the biasing unit; and the guide groove is formed on the female screw operating part, and through the differential rotation of the female screw operating part relative to the female screw side gear part, it is guided after being pressed to.

* * * * *